United States Patent [19]

Cassarino, Jr. et al.

[11] 3,909,802

[45] Sept. 30, 1975

[54] DIAGNOSTIC MAINTENANCE AND TEST APPARATUS

[75] Inventors: Frank V. Cassarino, Jr., Weston, Mass.; Edwin J. Pinheiro, Edina, Minn.

[73] Assignee: Honeywell Information Systems Inc., Waltham, Mass.

[22] Filed: Apr. 8, 1974

[21] Appl. No.: 458,921

[52] U.S. Cl. ........................ 340/172.5; 235/153 AK

[51] Int. Cl.[2] ........................ G06F 11/04

[58] Field of Search ........... 340/172.5; 235/153 AK, 235/153 AC

[56] References Cited

UNITED STATES PATENTS

| | | | |
|---|---|---|---|
| 3,387,262 | 6/1968 | Ottaway et al. | 235/153 AK |
| 3,603,936 | 9/1971 | Attwood et al. | 340/172.5 |
| 3,688,263 | 8/1972 | Balogh, Jr. et al. | 340/172.5 |
| 3,813,531 | 5/1974 | King et al. | 235/153 AK |

OTHER PUBLICATIONS

Hinz et al., Program Interruption by Instruction Address Monitoring, IBM Tech. Journal, Vol. 12, No. 4, September 1970, pp. 974–975.

Koederitz, Program Loop Switch for Testing Purposes, IBM Tech. Journal, Vol. 9, No. 2, July 1966, pp. 156–157.

*Primary Examiner*—Charles E. Atkinson

*Attorney, Agent, or Firm*—Faith F. Driscoll; Ronald T. Reiling

[57] ABSTRACT

Diagnostic apparatus couples to a control store of a microprogrammed peripheral processor and is used to cycle the store in a plurality of different modes. The diagnostic apparatus includes mode control circuits which when set to a first mode, cause an instruction bit pattern established by a plurality of switches to be loaded into the local register of the control store when the apparatus detects that a predetermined address established by a set of address switches of the apparatus compares to the address stored in the address register of the control store. During the following cycle, the switch established instruction bit pattern substituted for the instruction stored at the location designated by the address switches is executed. When the diagnostic apparatus is set to operate in a second mode, the switches are set to establish a branch type instruction containing an address corresponding to a starting address in the store to be repeated of a microprogram routine. Each time the diagnostic apparatus detects a comparison, it forces the store and processor to a known state. During a following cycle, the microinstruction is loaded into the local register and executed causing the store to branch to the routine specified for execution.

39 Claims, 17 Drawing Figures

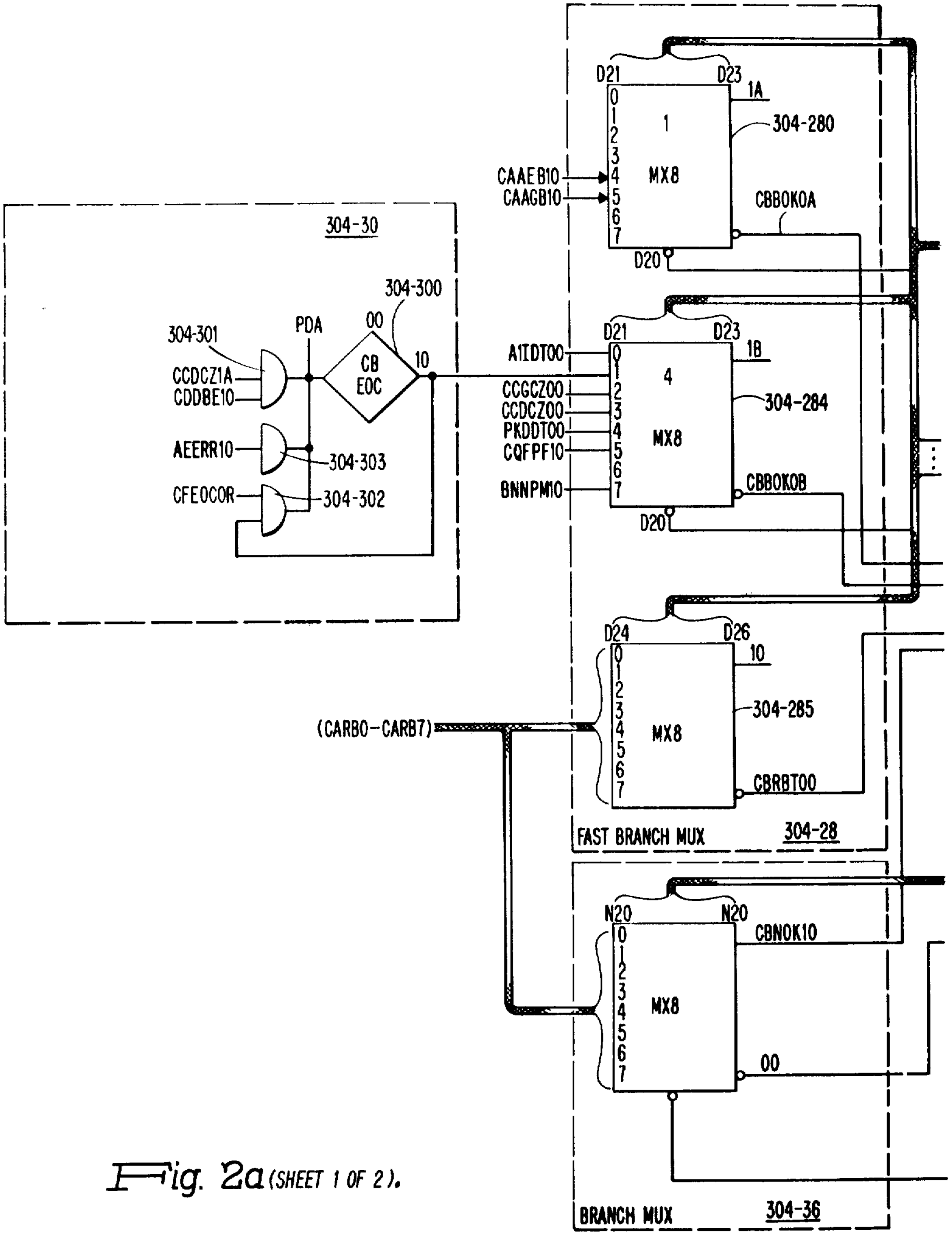
Fig. 2a (SHEET 1 OF 2).

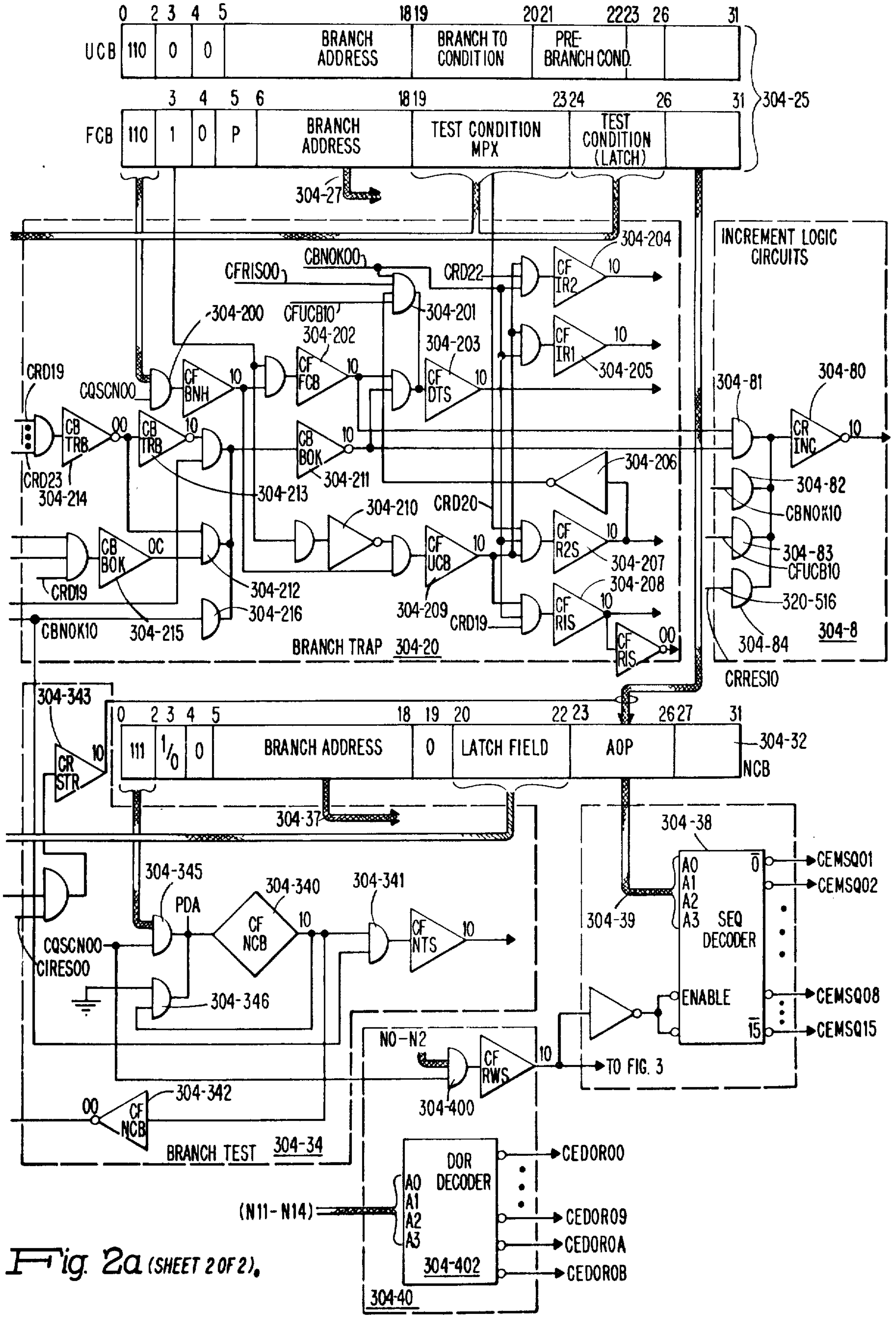
Fig. 2a (SHEET 2 OF 2).

RWS

| 0–2 | 3–14 | 15–18 | 19–20 | 21–22 | 23–26 | 27 | 28–31 |
|---|---|---|---|---|---|---|---|
| OP CODE (101) | RWS ADDRESS | COUNT | ADDR. SEL. | TRAP COUNT | SUB OPCODE | AP | DATA PARITY |

| | TABLE 1 |
|---|---|
| BIT 19, 20 | FUNCTION |
| 00 | NONE |
| 01 | USE CURRENT RWSAR AS RWS ADDRESS |
| 10 | USE 7 ROSLR BITS AND 4 LCN BITS AS RWS ADDRESS |
| 11 | USE 11 ROSLR BITS AS RWS ADDRESS |

| | TABLE 2 |
|---|---|
| BIT 23—26 | SUB OPCODE |
| 0000 | |
| 0001 | WRITE COUNT / HA / RO (AM) |
| 0010 | WRITE HA / RO (DM) |
| 0100 | READ COUNT / HA / RO |
| 0101 | SEARCH COUNT 1ST PASS |
| 0110 | SEARCH COUNT $\overline{\text{1ST PASS}}$ |
| 0111 | LOAD PARAMETER TABLE |
| 1000 | READ RWS (FIRMWARE) |
| 1001 | WRITE RWS FROM C REG. |
| 1010 | WRITE RWS FROM D REG. |
| 1011 | WRITE RWS FROM RWSLR |

Fig. 3a.

UCB

| 0–2 | 3 | 4 | 5 | 6–18 | 19–20 | 21–22 | 23–26 | 27 | 28–31 |
|---|---|---|---|---|---|---|---|---|---|
| OP CODE (110) | 0 | 0 | P | BRANCH ADDRESS | BRAN. TO ADDR COND. | PRE BRAN. COND. (TABLE 1.) * | | AP | DATA PARITY |

| | TABLE 1 * |
|---|---|
| 21, 22 | FUNCTION |
| 00 | BRANCH W/O ANY ADDR. REG. SET |
| 01 | BRANCH W ROS RET ADDR REG 2 SET |
| 10 | BRANCH W ROS RET ADDR REG 1 SET |
| 11 | ILLEGAL |

| | TABLE 2 |
|---|---|
| 19, 20 | FUNCTION |
| 00 | BRANCH TO ADDR. SUPPLIED BY ROS |
| 01 | BRANCH TO RET ADDR REG 2 |
| 10 | BRANCH TO RET ADDR REG 1 |
| 11 | ILLEGAL |

Fig. 3b.

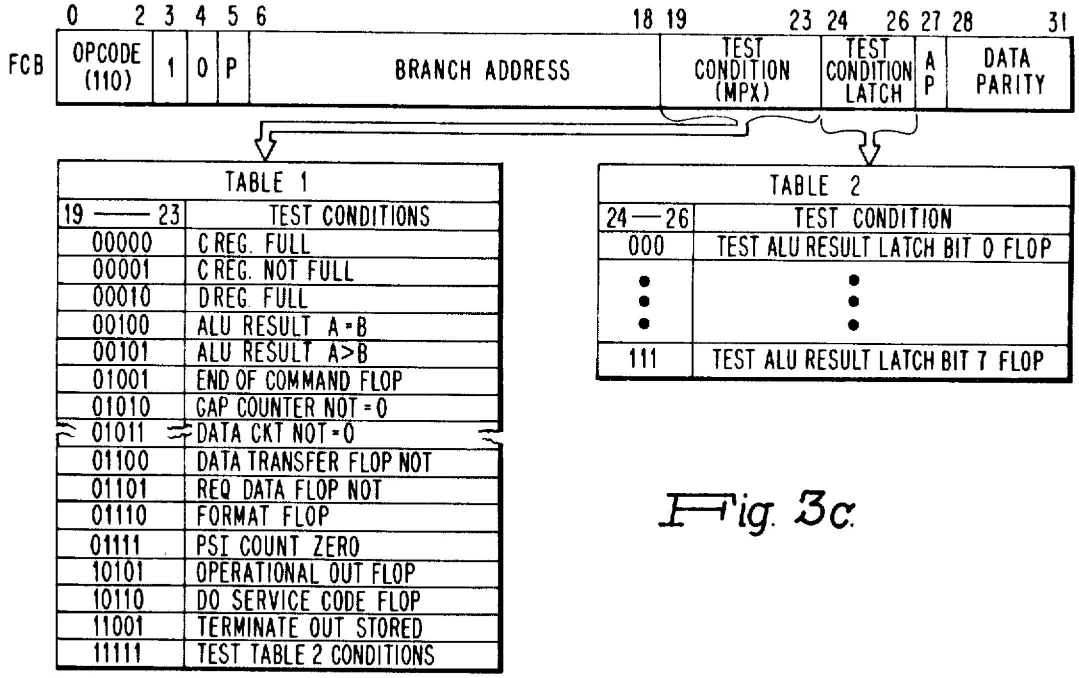

| TABLE 1 | |
|---|---|
| 19 —— 23 | TEST CONDITIONS |
| 00000 | C REG. FULL |
| 00001 | C REG. NOT FULL |
| 00010 | D REG. FULL |
| 00100 | ALU RESULT A=B |
| 00101 | ALU RESULT A>B |
| 01001 | END OF COMMAND FLOP |
| 01010 | GAP COUNTER NOT=0 |
| 01011 | DATA CKT NOT=0 |
| 01100 | DATA TRANSFER FLOP NOT |
| 01101 | REQ DATA FLOP NOT |
| 01110 | FORMAT FLOP |
| 01111 | PSI COUNT ZERO |
| 10101 | OPERATIONAL OUT FLOP |
| 10110 | DO SERVICE CODE FLOP |
| 11001 | TERMINATE OUT STORED |
| 11111 | TEST TABLE 2 CONDITIONS |

| TABLE 2 | |
|---|---|
| 24 — 26 | TEST CONDITION |
| 000 | TEST ALU RESULT LATCH BIT 0 FLOP |
| • • • | • • • |
| 111 | TEST ALU RESULT LATCH BIT 7 FLOP |

Fig. 3c

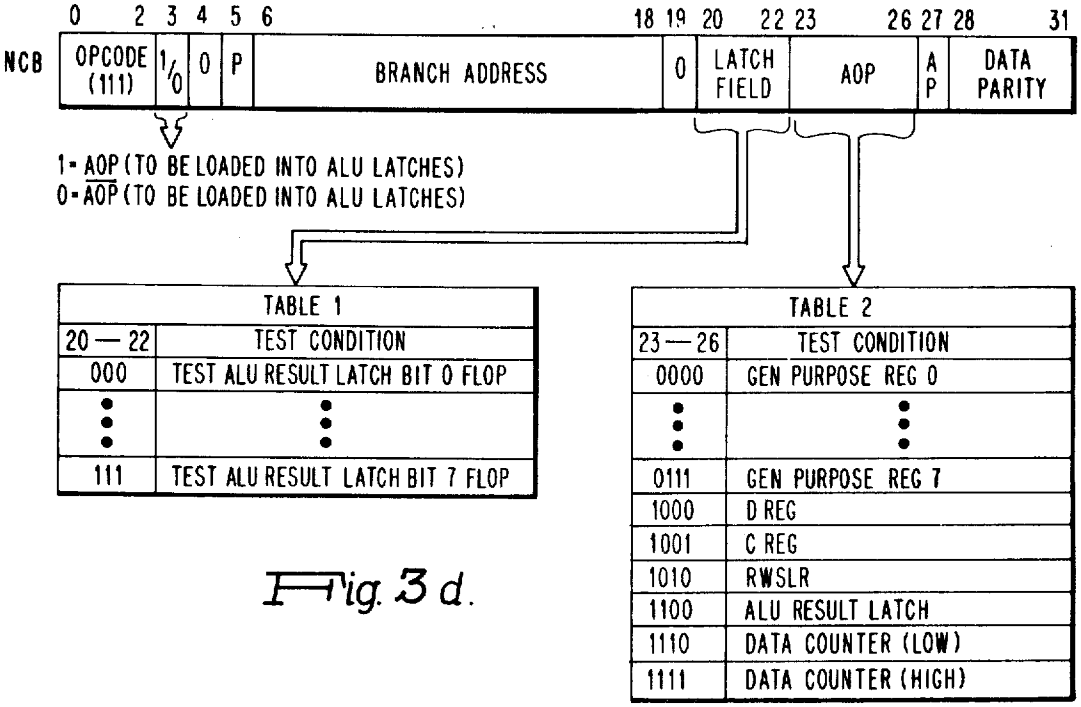

| TABLE 1 | |
|---|---|
| 20 — 22 | TEST CONDITION |
| 000 | TEST ALU RESULT LATCH BIT 0 FLOP |
| • • • | • • • |
| 111 | TEST ALU RESULT LATCH BIT 7 FLOP |

| TABLE 2 | |
|---|---|
| 23 — 26 | TEST CONDITION |
| 0000 | GEN PURPOSE REG 0 |
| • • • | • • • |
| 0111 | GEN PURPOSE REG 7 |
| 1000 | D REG |
| 1001 | C REG |
| 1010 | RWSLR |
| 1100 | ALU RESULT LATCH |
| 1110 | DATA COUNTER (LOW) |
| 1111 | DATA COUNTER (HIGH) |

Fig. 3d

DIAGNOSTIC MAINTENANCE AND TEST APPARATUS

BACKGROUND OF THE INVENTION

1. Field of Use

The present invention relates to diagnostic apparatus and more particularly to apparatus for diagnosing errors of a system.

2. Prior Art

Various techniques have been employed to perform microdiagnostics for determining which portions of a system or subsystem has failed. One such technique involves apparatus which conditions a control store for cycling in one of a number of modes. When a "recycle mode" is selected for the control store, this enables an address established by a first set of switches to be compared with the address stored in the address register of the control store. When a true comparison is signalled, an address established by second set of switches is loaded into the control store address register which in turn causes the control store to reference the instruction designated by the address. The control store continues to execute instructions until another status comparison occurs whereupon the control store again references the address specified by the second set of switches. In this arrangement, by altering the address established by second set of the switches, the control store is enabled to reference different instructions.

A disadvantage of this arrangement is that in the instance where it is decided to establish an instruction loop, the control store may not follow the same sequence of instructions since the execution of a previous sequence of instructions might have caused certain indicators to be set which condition the control store to follow a different sequence of instructions the next time through the loop.

Accordingly, the primary object of the present invention is to provide an improved method and apparatus for providing diagnosis of system failures within a microprogrammed processing system.

It is another object of the present invention to provide apparatus which facilitates establishing of execution of a microinstruction loop within a control store for diagnosing in a system for failures.

It is still a further object of the present invention to provide apparatus which facilitates the establishment of a read only control store execution of a predetermined sequence of instructions.

SUMMARY OF THE INVENTION

The above objects are achieved according to the present invention by providing diagnostic apparatus which couples to the address register and to the local register of a control store of a microprogrammed processing system. The diagnostic apparatus includes a first set of switches for establishing a first address, a second set of switches for establishing an instruction bit pattern and mode control circuits. Comparison circuits included within the apparatus are operative to generate a control signal when the address contents of the address register compares to the address signals established by the first set of switches. When the diagnostic apparatus is set to operate in a first mode, the control signal causes the instruction bit pattern established by the second set of switches to be loaded into the local register of the control store, thereby allowing the operation designated by the bit pattern to be executed during the next cycle of operation.

When the diagnostic apparatus is set to operate in a second mode, the control signal causes the system to be initialized or switched to a known state at which time the control store is forced to a known address. Thereafter, the bit pattern established by the second set of switches is loaded into the local register for execution. By having the system including the control store be set to a known state, a routine reference by the bit pattern established through the second set of switches is executed in the same manner each time the same loop of instructions is referenced.

In addition to facilitating the repeated execution of an instruction loop, the diagnostic apparatus is able to provide for execution at any point in time of any type of instruction included within the repertoire of instructions executed by the system. As mentioned, this is accomplished by modifying the positions of the second set of switches to specify various types of branch addresses, branching conditions and instruction types for execution. Hence, the arrangement enables maintenance personnel to establish those conditions necessary to select a portion of the machine to be tested in a logical manner. By changing conditions associated with a branching operation, testing can proceed when certain conditions are not present within the system.

In addition to the foregoing, a further set of address switches are used to establish a point at which the diagnostic apparatus generates a sync pulse. By including an independent set of switches, any address can be selected to cause the generation of pulses used to synchronize test equipment used by maintenance personnel.

The above and other objects of the present invention are achieved in the illustrative embodiment described hereinafter. The novel features which are believed to be characteristic of the invention, both as to its organization and method of operation, together with further objects and advantages will be better understood from the following description when considered in connection with the accompanying drawings. It is to be expressly understood, however, that each of the drawings is for the purpose of illustration and description only and is not intended as a definition of the limits of the invention.

BRIEF DESCRIPTION OF THE DRAWINGS

FIG. 2*a* illustrates in greater detail the circuits included within certain blocks of FIG. 2.

FIGS. 3*a* through 3*h* illustrate the various microinstruction word formats which can be employed by the diagnostic apparatus of the present invention.

DESCRIPTION OF THE PREFERRED EMBODIMENT

Figure 1:
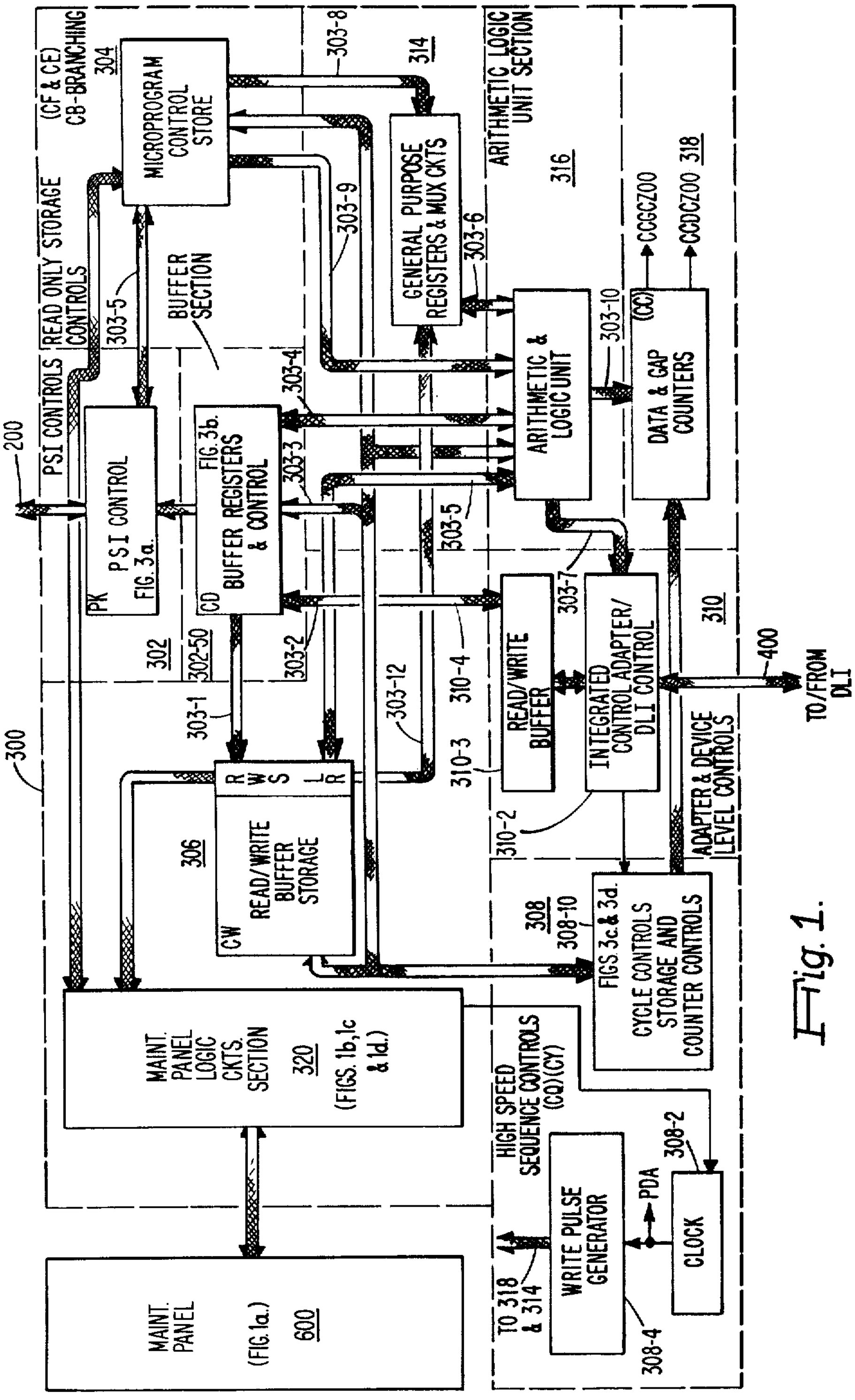
FIG. 1 is a block diagram of a microprogrammed peripheral controller employing the present invention.

Referring first to FIG. 1, there is disclosed a microprogrammed peripheral controller 300 which includes the diagnostic apparatus of the present invention. As seen from the Figure, the major section of the processor 300 includes: a peripheral subsystem interface (PSI) control section 302; a general purpose register section 314; an arithmetic and logic unit (ALU) section 316; a read only storage control section 304; a high speed sequence control section 308; a device level interface (DLI) control section 310; a read/write buffer storage (RWS) section 306; and a counter section 318. For the purpose of the present invention, only the read only storage controls section 304 need be described in detail. For further information regarding the other sections, reference may be made to a copending application titled "Microprogrammable Peripheral Processing System" invented by John A. Recks et al., bearing Ser. No. 425,760 filed on Dec. 18, 1973 which is assigned to the assignee of the present invention.

As seen from FIG. 1, different ones of the microprogrammable peripheral controller sections couple to a diagnostic and maintenance control section 320. The section 320 couples to the circuits of a maintenance panel 600 which operates to display signals and control the mode of operation of section 320.

READ ONLY STORAGE CONTROL SECTION 304

Figure 2:
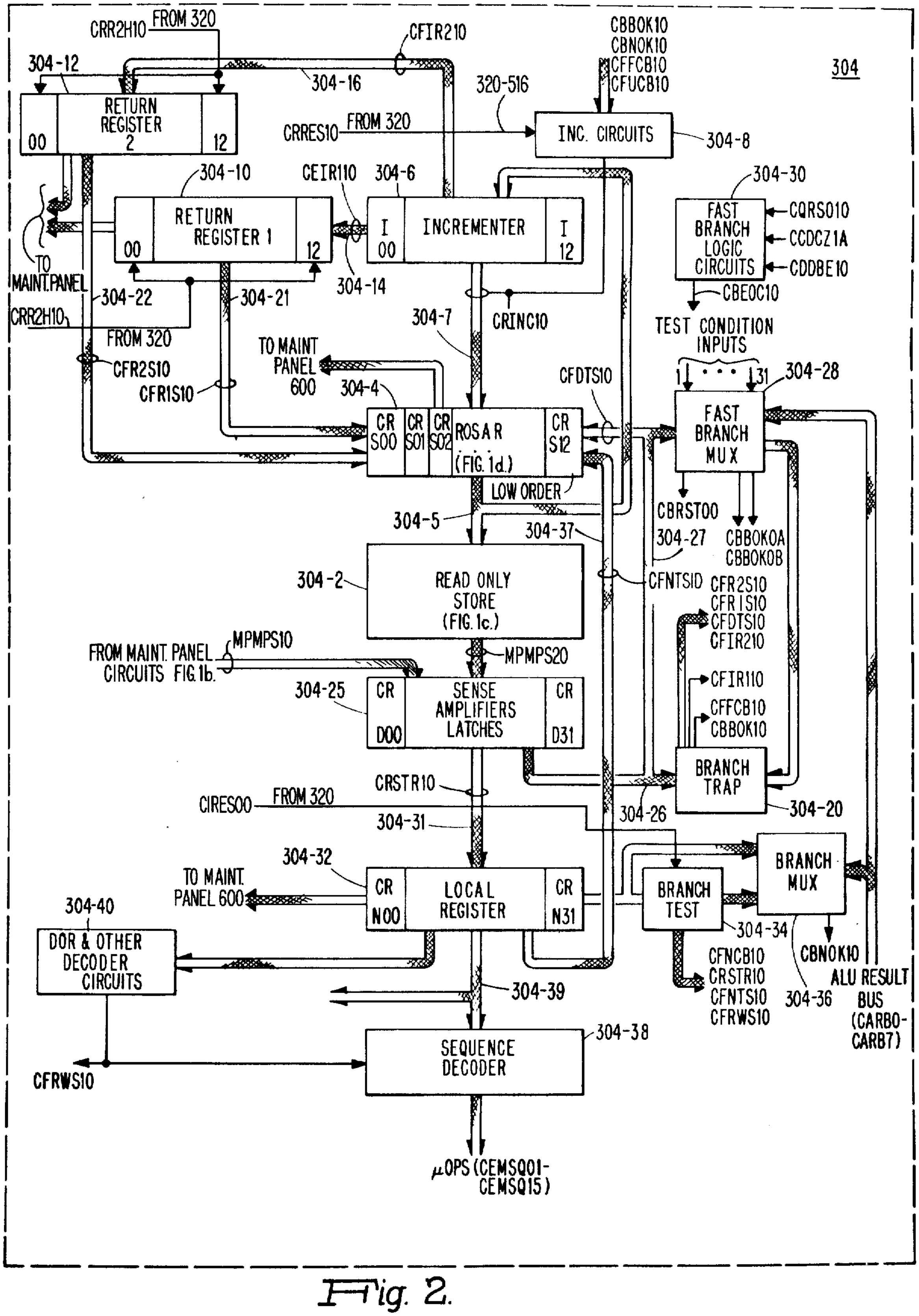
FIG. 2 illustrates in greater detail the read only storage controls section of FIG. 1.

Before describing the circuits included within section 320 and the maintenance panel 600, the read only storage control section 304 will be described with reference to FIGS. 2 and 2*a*. FIG. 2 shows the section 304 in block diagram form. It is seen that this section includes a read only memory 304-2, addressable via an address register 304-4 which applies a 13 bit address via a path 304-5. The same address is applied to an incrementer register 304-6. The register 304-6 conventional in design, enables its contents to be incremented by one and loaded into register 304-4 via path 304-7 in response to increment control signal CRINC10 being forced to a binary ONE by control circuits of block 304-8.

Additionally, the contents of register 304-6 are applied to a pair of return registers 304-10 and 304-12 via paths 304-14 and 304-16 respectively. The contents of the register 304-6 are selectively loaded into one of the return registers in response to one of a pair of signals CFIR110 and CFIR210 being forced to a binary ONE by the branch trap circuits of block 304-20. Similarly, the contents of return registers 304-10 and 304-12 are selectively loaded into address register 304-4 via paths 304-21 and 304-22 in response to one of a pair of signals CFR1S10 and CFR2S10 being forced to a binary ONE by branch trap circuits 304-20.

When addressed, the store 304-2 applies signals to the sense latching amplifier circuits of a register 304-25 which are in turn applied to the branch trap circuits 304-20 for decoding and to address register 304-4 via paths 304-26 and 304-27 respectively. When the branch trap circuits 304-20 decode a branch microinstruction and the test condition is satisfied, they force a signal CFDTS10 to a binary ONE causing the contents of an address field to be loaded into register 304-4.

Additionally, a portion of the contents from circuits 304-25 are applied to the multiplexer selector circuits of a fast branch MUX block 304-28 which also receives a plurality of test condition input signals on input terminals 1–31, one of which is applied from logic circuits of block 304-30 and input signals from the ALU section (i.e. bus signals CARB0-BARB7). The circuits of MUX block 304-28 generate output signals representative of conditions being tested which are applied to the branch trap block 304-20. This block will be described in greater detail in connection with FIG. *3f*.

The contents of circuits 304-25 are selectively applied to the flip-flop stages of local register 304-32 via a path 304-31 and loaded into the register when circuits included in a branch test block 304-34 force a strobe signal CRSTR10 to a binary ONE. Portions of the contents of register 304-32 are applied to the branch test block 304-34 and to a multiplexer selector circuit including in a branch MUX block 304-36. Additionally, the MUX block receives signals from the ALU as indicated. Also, register 304-32 loads an address into the address register 304-4 via a path 304-37 when the branch test block forces a signal CFNTS10 to a binary ONE. Circuits included within a sequence decoder 304-38 generate the micro-operation control signals in response to the signals applied via a path 304-39 from register 304-32.

MICROINSTRUCTION FORMATS

Before describing the various blocks of FIG. 2, in greater detail, the different types of microinstructions and their formats executed by store 304 will be described with reference to FIGS. 3*a* through 3*h*.

Referring to FIG. 3*a*, there is shown a read/write store (RWS) microinstruction word which is used to control the address and data path of information to be read from or written into the read/write storage section 306. As seen from the Figure, this microinstruction word has an op code of 101 specified by bits 0 through 2. Bits 3 through 14 form a field which indicates the location in the read/write buffer storage for reading out or writing into a single byte. In the case for more than a single byte read/write operation, the contents of this location specify a starting address. The next field is a count field which includes bits 15 through 18. This field is used primarily for read/write or search count or header address operations which require either the reading or writing of information continuously from or to respectively the read/write buffer storage section. For example, the four bit count specified by this field can be loaded into the low order byte position of the data counter contained within section 318 while the rest of the stages of the counter are filled with zeros by the hardware. Bits 19 and 20 serve as an address select field which can specify three ways by which the firmware can generate a read/write storage address. These ways are set out in the associated table. It is seen from this table that when this field is set to 01, the hardware utilizes the contents of the read/write storage address register without referencing the RWS address field of the microinstruction. When the field is set to 10, the firmware generates the read/write store address by loading a four bit current logical channel number (LCN) into bit positions 2 through 5 of a read/write store address register; the remainder of the address bits are taken from the RWS address field contained in the microinstruction. When this field is set to 11, the entire RWS address designated by the RWS address field of the microinstruction contained in the read only store local register is used.

Bits 21 and 22 serve as a trap count field and are used to specify the number of bytes which are to be masked in order to perform in various modes of operation. Bits 23 through 26 constitute a four bit field which is used to designate particular sequences required for read/write or search operations involving the storing of information into the scratch pad store of the read/write storage section. The table indicates the type of operations which are specified by different codings of the sub op code bits.

FIG. 3*b* shows the format of an unconditional branch (UCB) microinstruction. This microinstruction is one of two "fast branch" microinstructions which requires that the bits of the microinstruction be decoded from the sense amplifier latches in order to enable generation of a next microinstruction word address within one clock pulse time period. As implied from the name, this microinstruction is used to specify a non test branch operation for the purpose of calling in another microprogram or routine. The op code bits 0 through 2 as shown in FIG. 3*b* are coded as 110. Bit 3 is set to a binary ZERO to specify that this is an unconditional fast branch operation. Bits 21 and 22 correspond to a "prebranch condition" field which is used to specify the setting of a return address before the unconditional branch. More specifically, the read only storage control section 304, as mentioned, includes two branch return registers (i.e. return address register 1 and return address register 2) which are used to keep track of addresses when branching from one routine to another. As indicated by the table in FIG. 3*b*, when bits 21 and 22 are set to 00, branching occurs without requiring any return register to be set to a particular address. When the bits 21 and 22 are set to 10, the branching hardware is operative to increment by one the current address found in ROSAR (304-4) and store it into return address register 1 before branching to a new address. After the routine branch to has been completed, the contents of return address register 1 are used to return to the first or original routine. When bits 21 and 22 are set to 01, the return address register 2 is loaded with the address of the microinstruction after it has been incremented by 1. This address register provides a second level of branch return. As indicated by the same table, it is undesirable to set bits 21 and 22 to 11 because this will result in loading the same address into both address registers 1 and 2.

As indicated by the FIG. 3*b*, bits 5 through 18 constitute a 13 bit branch address wherein bit 18 is the least significant bit and bit 5 constitutes an odd parity bit. Bits 19 and 20 constitute a "branch to address condition" field which specifies the conditions indicated in the table. When these bits are set to 00, the store will branch to a location defined by the branch address of the microinstruction. When bits 19 and 20 are set to 01, the store branches to an address contained in return address register 2 while it will branch to the address contained in return address register 1 when these bits are set to 10. Similarly, bits 19 and 20 will not be set to 11 since this is defined as an illegal condition. Bits 23 through 26 normally contain all zeros since they constitute an unused field. The rest of the bits are as indicated.

FIG. 3*c* shows the format of the second fast branch microinstruction which corresponds to a fast conditional branch (FCB) microinstruction. As shown, it has the same op code as the unconditional branch microinstruction but has bit 3 set to a binary ONE. The store branches to the location specified by the branch address field of the fast conditional branch microinstruction.

Bits 5 through 18 constitute a branch address field while bits 19 through 23 constitute a multiplex test condition field. The test conditions are defined as indicated in table 1 of FIG. 3*c*. There can be up to 31 flip-flops which are capable of being tested. The table indicates some of the more pertinent flip-flops. The test is made to determine whether or not flip-flop is in its binary ONE or set state. When this field is set to all ones, this indicates that none of the 31 test flops are to be tested but that one of the latches which receive the ALU result bus signals defined by bits 24 through 26 are to be tested. Bits 24–26 constitute a test condition latch field which is coded as indicated by Table 2. As explained herein, this field enables the contents of any one of the eight bit registers delivered through the ALU section to be tested on a bit by bit basis.

FIG. 3*d* illustrates the format of a normal conditional branch (NCB) microinstruction. Unlike the fast conditional branch and unconditional branch microinstructions, this microinstruction is decoded at the output of the read only store local register and requires an interval of two clock pulse periods to obtain the results of the test. The normal conditional branch microinstruction enables the testing of any bit position (binary ONE and binary ZERO states) of a register specified by the A operand field of the microinstruction. As seen from FIG. 3*d*, this microinstruction has an op code of 111. Bit 3 indicates whether the binary ONE or binary ZERO of outputs of the registers specified by the A operand field are to be tested. Bits 4 and 19 are unused fields and therefore set to binary ZEROS. Bits 5 through 18 constitute a branch address field while bits 20 through 22 constitute a latch field. As seen from the Figure, these bits when coded as indicated by Table 1 define the bit position of the ALU selected register to be tested. Bits 23 through 26 constitute the A operand AOP field which defines as indicated by Table 2 any one of 16 registers whose contents can be stored in the ALU latches.

Figure 3E:
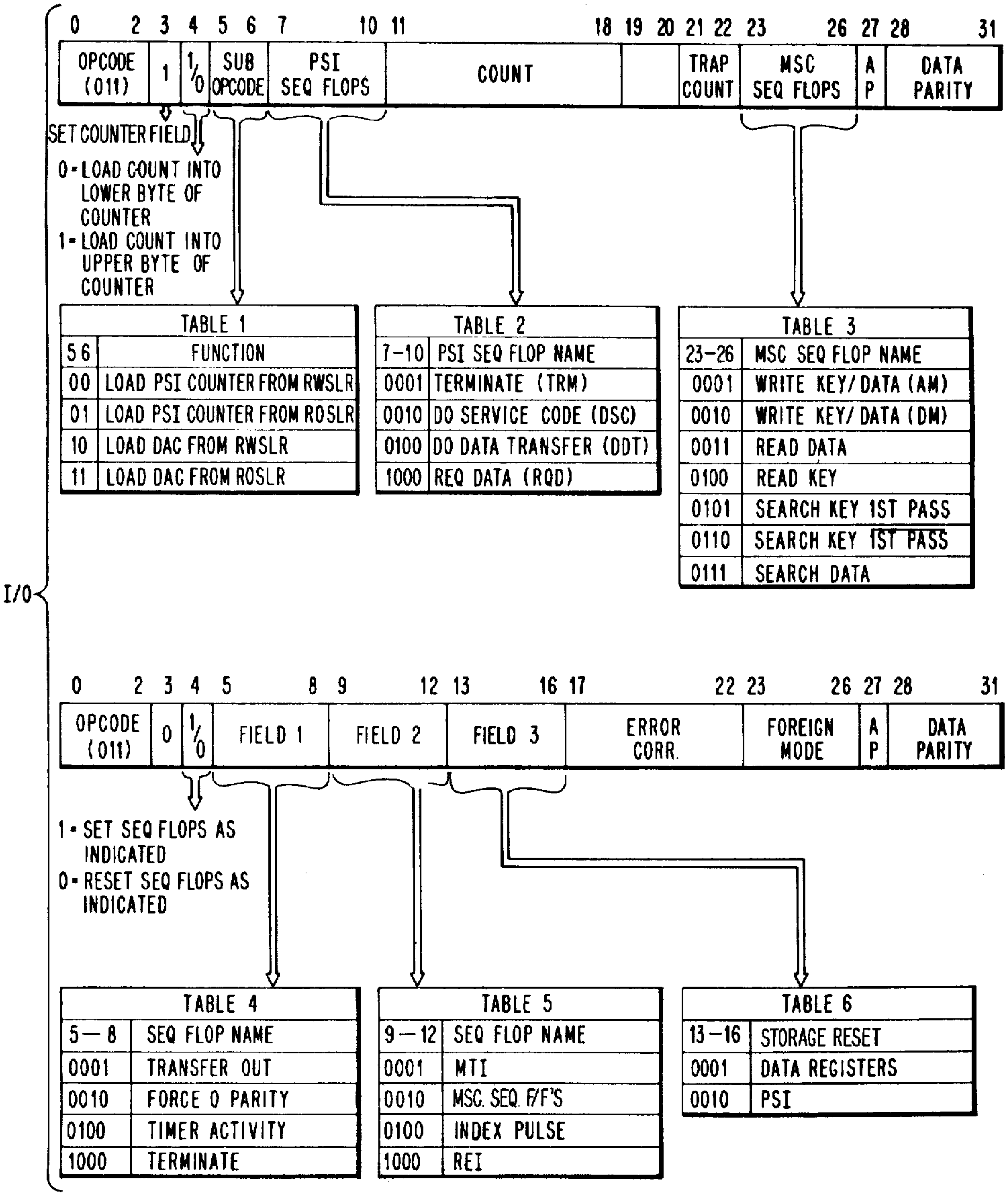

FIG. 3*e* shows the formats of an input/output, (i.e. I/O) microinstruction. This microinstruction is used to condition the mass storage processor, PSI, and device adapter circuits to handle those operations requiring information transfers to/from the device adapter and IOC interfaces. As seen from FIG. 3*e*, this microinstruction word has an op code 011. Bit 3 corresponds to a set counter bit which when set to a binary ONE causes either an input/output counter or data counter to be loaded with either the contents of the count field which comprises bits 11 through 18 or from the RWSLR. This operation occurs for input/output operations such as a service code sequence, a write data sequence, a read data sequence, a search key or data sequence etc. When this bit is set to a binary ZERO, none of the aforementioned counters are loaded with information but only the sequence flip-flops are set/reset as indicated by Tables 4 through 6 of FIG. 3*e*. Bit 4 is used when a count field is used (i.e. bit 3 is a binary ONE). This bit is used to indicate to the processor which byte of the two byte PSI or data counters is to be loaded with the count specified by the count field. In the instance where two bytes are loaded into the counters, this requires two I/O microinstruction words. Every time the low order byte positions of a counter are loaded, the upper order byte positions of the same counter are all reset to binary ZEROS. When bit 4 is a binary ZERO, it indicates that the low order byte positions of the counter are loaded with the count field of the I/O microinstruction. Conversely, when bit 4 is a binary ONE, the upper byte positions of the counter are loaded with the microinstruction count field. When bit 3 of this microinstruction is set to a binary ZERO, this signals the processor which flip-flops in fields 1 through 3 and those in the error correction and foreign mode fields are to be set or reset. When bit 4 is set to a binary ONE, those flip-flops designated by these fields are set to binary ONES. When bit 4 is a binary ZERO, those flip-flops designated by the fields are reset to their binary ZERO states. Bit 4 has no significance when the fields are coded to contain all zeros. Tables 4 through 6 set forth representative codes for certain ones of the flip-flops contained within the mass storage processor.

Bits 5 and 6 specify a sub op code field when the count field is used (i.e. bit 3 is a binary ONE). The sub op code field defines which one of the counters (i.e. PSI byte counter or data counter) is to be loaded and the source of the count to be loaded (i.e. from the read/write storage local registers or read only store local register). Table 1 defines the various codings for these bits and corresponding functions. Bits 7 through 10 define a PSI sequence flop field when bit 3 is set to a binary ONE. These flip-flops, as mentioned above, set up the data paths for the PSI apparatus to handle data transfers between the IOC and mass storage processor. Table 2 illustrates the codes for designating different ones of these four flip-flops. While the coding of bits 7 through 10 illustrate the setting of a single flop, they can be modified to set more than a single sequence flop with a single microinstruction. Bits 11 through 18 designate a count field which is used by the processor to load either the PSI counter or data counter. When loading the two byte wide counters, either the PSI or sequence flops are set only when a count is being loaded into the upper byte stages of the counter. As indicated by FIG. 3*e*, bits 19 and 20 are unused bits when bit 3 is a binary ONE. Bits 21 and 22 serve as a trap count field when bit 3 is a binary ONE. This count field indicates the number of bytes to be trapped by the processor during a read, a write or a search operation. Depending upon the particular record format being processed, this field will be set to specify the correct number of bytes to be trapped. Bits 23 through 26 define a sequence flop field when bit 3 is a binary ONE. The sequence flip-flops are set to a predetermined states which in turn establish the path for accomplishing bidirectional transfers of information through the various registers of the MSP. The codings for these fields are as indicated in Table 3 of FIG. 3*e* and some of these flip-flops were previously discussed above.

When bit 3 is set to a binary ZERO, bits 5 through 26 are utilized as indicated by Tables 4 through 6.

Figure 3F:
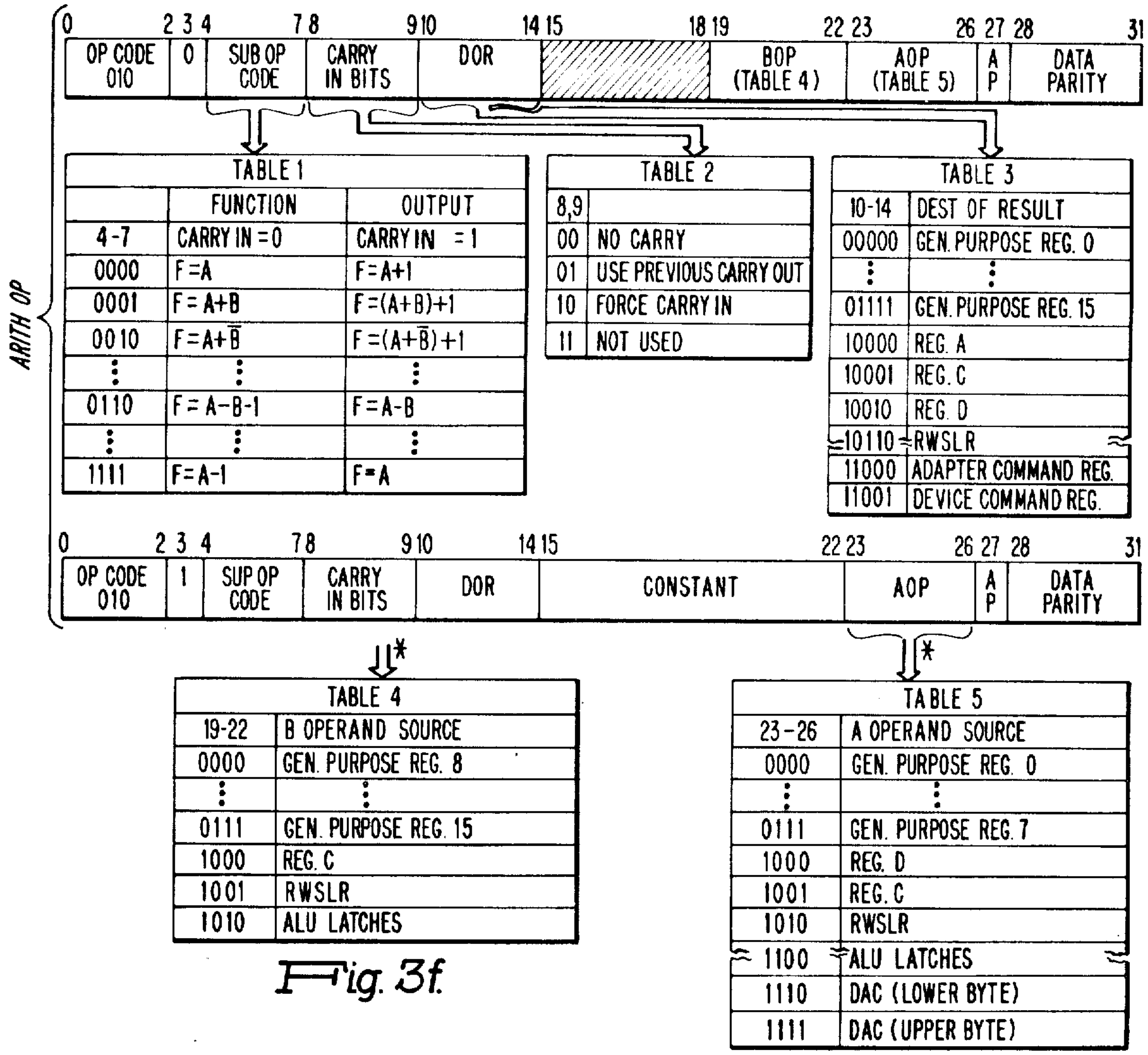
Figure 3G:
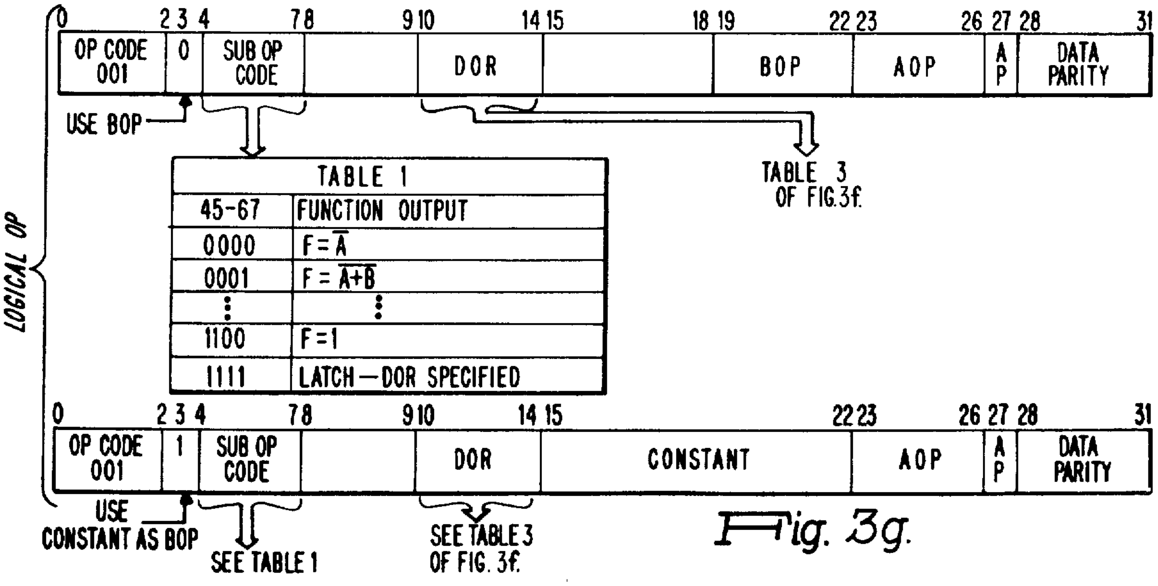

FIG. 3*f* illustrates two formats for microinstructions used for specifying different arithemtic operations. The arithmetic operation microinstructions include an op code 010. Bit 3 is used to indicate different formats of the microinstruction. Bits 4 through 7 constitute a sub op code field which defines up to 16 different arithmetic operations some of which are logical operations. Table 1 indicates certain ones of the arithmetic operations coded by bits 4 through 7. These operations are well known and therefore will not be described in greater detail herein. For further information, reference may be made to a text titled "The Integrated Circuits Catalog for Design Engineers" published by Texas Instruments Inc. and dated 1972. Bits 8 and 9 serve as a carry in field and are coded in accordance with Table 2 to specify three different carry in conditions for performing various arithmetic operations. Bits 15 through 18 are not used when bit 3 is a binary ZERO and therefore these bits are binary ZEROS. Bits 10 through 14 are coded as indicated by Table 3 to specify the destination of the result (DOR) produced by an arithemtic operation. Bits 19 through 22 constitute a B operand (BOP) constant field which indicate the source of the B operand in accordance with Table 4. Similarly, bits 23 through 26 indicate the source of the A operand (AOP) in accordance with Table 5. It will be noted from FIG. 3*f* that when bit 3 is a binary ONE, bits 15 through 22 are used as the B operand. FIG. 3*g* illustrates two formats for microinstructions used for specifying different types of logical operations. The logical operation microinstructions include an op code 001. The state of a format bit 3 when a binary ZERO indicates that one of the registers designated in the table is to be the source of the B operand. When bit 3 is a binary ONE, the eight bit constant field of the microinstruction is the B operand. Bits 4–7 of a sub op code field designate the logical operation to be performed by the ALU upon the A and B operands. Table 1 indicates some of the type operations. However, the aforementioned text published by Texas Instruments may be consulted for more information.

Bits 15 through 18 are not used when bit 3 is a ZERO. Bits 8 and 9 are not used in logical operations. Bits 10–14 constitute a destination of ALU result field and is coded to specify one of the registers in the table indicated for receiving the result generated by the ALU. All codes, except 11110 and 11111, cause the result to be delivered to the designated register as well as storing it in the ALU latches. With codes 11110 and 11111, the result is not transferred to a register but is only stored in the ALU latches.

As mentioned above, bits 19–22 define the source of the B operand to the ALU when bit 3 is a ZERO. Bits 15–22 define the B operand when bit 3 is a binary ONE. Also, bits 8 and 9 are not used in this type microinstruction. Similarly, bits 23–26 define the source of the A operand to the ALU.

Figure 3H:
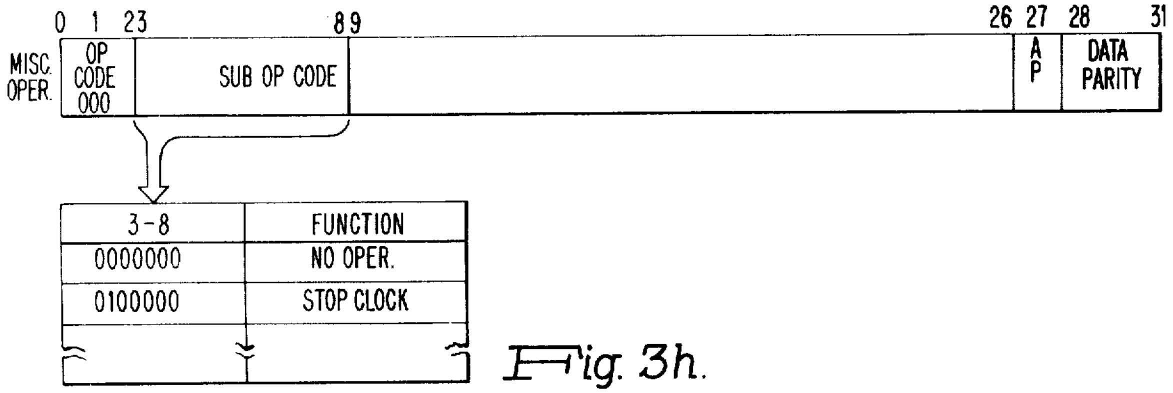

FIG. 3*h* illustrates a format for microinstructions used for specifying miscellaneous types of operations. As seen from the Figure, the microinstruction word has an op code field, a sub op code field, and address and data parity bit fields. The three bit op code field (0–2) is coded as 000 which specifies the miscellaneous operation. When this microinstruction has bits 3–8 coded with all zeros, it specifies a no operation which causes the control store to skip over the microinstruction word being referenced. The other coding of bits 3–8 shown in FIG. 3*h* causes the operations indicated to take place. These operations are not pertinent to the present invention and will not be explained further herein.

DETAILED DESCRIPTION OF THE CIRCUITS OF FIG. 2

With reference to FIG. 2*a*, certain ones of the circuits of FIG. 2 will be described in greater detail.

DETAILED DESCRIPTION OF THE ROS CIRCUITS OF FIG. 2*a*

With reference to FIG. 2*a*, certain ones of the circuits of FIG. 2 will now be described in greater detail. Referring to this Figure, it is seen that the branch trap block 304-20 includes the circuits 304-200 through 304-215 which are arranged as shown. As mentioned, these circuits generate the required signals during the execution of the two fast instructions which are directly applied to the circuits by sense amplifier latches 304-25. The signals produced by the branch trap circuits are generated in accordance with the following Boolean statements.

1. CFDTS10 (ROS DATA TO ROSAR) = CFUCB10 . CBNOK00 . CRF1S00 . CFR2S00 + CFFCB10 . CBBOK10.
2. CFFCB10 (Fast Conditional Branch) = CFBNH10 . CRD0310.
3. CFIR110 (incrementer to return Reg 1) = CFUCB10 . CBNOK00 . CRD2110.
4. CFIR210 (incrementer to return Reg 2) = CBNOK00 . CFUCB10 . CRD2210.
5. CFR1S10 (return Reg 1 to ROSAR) = CFUCB10 . CRD1910 . CBNOK00.
6. CFR2S10 (return Reg 2 to ROSAR) = CFUCB10 . CRD2010 . CBNOK00.
7. CBBOK10 (branch OK for FCB) = $\overline{\text{CBBOKOC . CBTRB00 + CBTRB10 . CBRBT00 + CBNOK10}}$.
8. CBBOKOC (FCB Test conditions) = CBBOKOA . CRD1900 . CBBOKOB.
9. CFUCB10 (Unconditional Branch) = CFBNH10 . CRD0300.

The signals CBBOKOA, CBBOKOB and CBRBT00 are derived from corresponding ones of the multiplexer selector circuits 304-280 through 304-285 included within the fast branch MUX block 304-28. These circuits receive a number of input signals from various parts of the processor and these signals representative of certain test conditions are sampled and the results of the sampling are applied to the branch trap circuits 304-20 as shown. One of the inputs applied to multiplexer circuit 304-284 is signal CBEOC10 which is generated by a flip-flop 304-300 included within the fast branch logic circuits of block 304-30. As shown, this block includes this flip-flop together with associated gating circuits 304-301 through 304-303 arranged as shown.

Other test signals include an index pulse not received signal A1IDT00 generated by the adapter section 310 in response to index pulse signal from line IDX, a gap counter not equal zero signal CCGCZ00 from section 318, a data counter not equal zero signal CCDCZ00 from section 318, a data termination flop not set signal PKDDT00 from section 302, and first pass/format flop set signal CQFPF10 from the high speed sequence controls section 308. It will also be noted that circuit 304-280 receives an A equal B signal CAAEB10 and an A greater than B signal CAAGB10 from the ALU section 316.

It is also seen from FIG. 2*a* that the branch test circuits of block 304-34 include the circuits 304-340 through 304-346 which are arranged as shown. These circuits are operative to generate branch signals in response to a normal condition branch microinstruction stored in read only store local register 304-32. Additionally, these circuits generate signals for enabling sequence decoder circuit 304-38 which is operative to decode bits 23 through 26 of the normal condition branch microinstruction which are applied via path 304-39. The multiplexer selector circuits included within branch MUX block 304-36 provide a branch signal CBNOK10 in response to sampling one of the latches of the ALU section as specified by latch field bits 20 through 22. Additionally, signal CBNOK10 is applied to the circuits included within increment logic circuit block 304-8. As shown, this block includes circuits 304-80 through 304-84. These circuits force signal CRINC10 to a binary ONE in accordance with the following Boolean statement:

CRINC10 (increment ROSAR) = (CBNOK00 . CFUCB00 . CRRES00) . (CFFCB10 + CBBOK00).

MAINTENANCE PANEL 600 DESCRIPTION

Figure 1A:
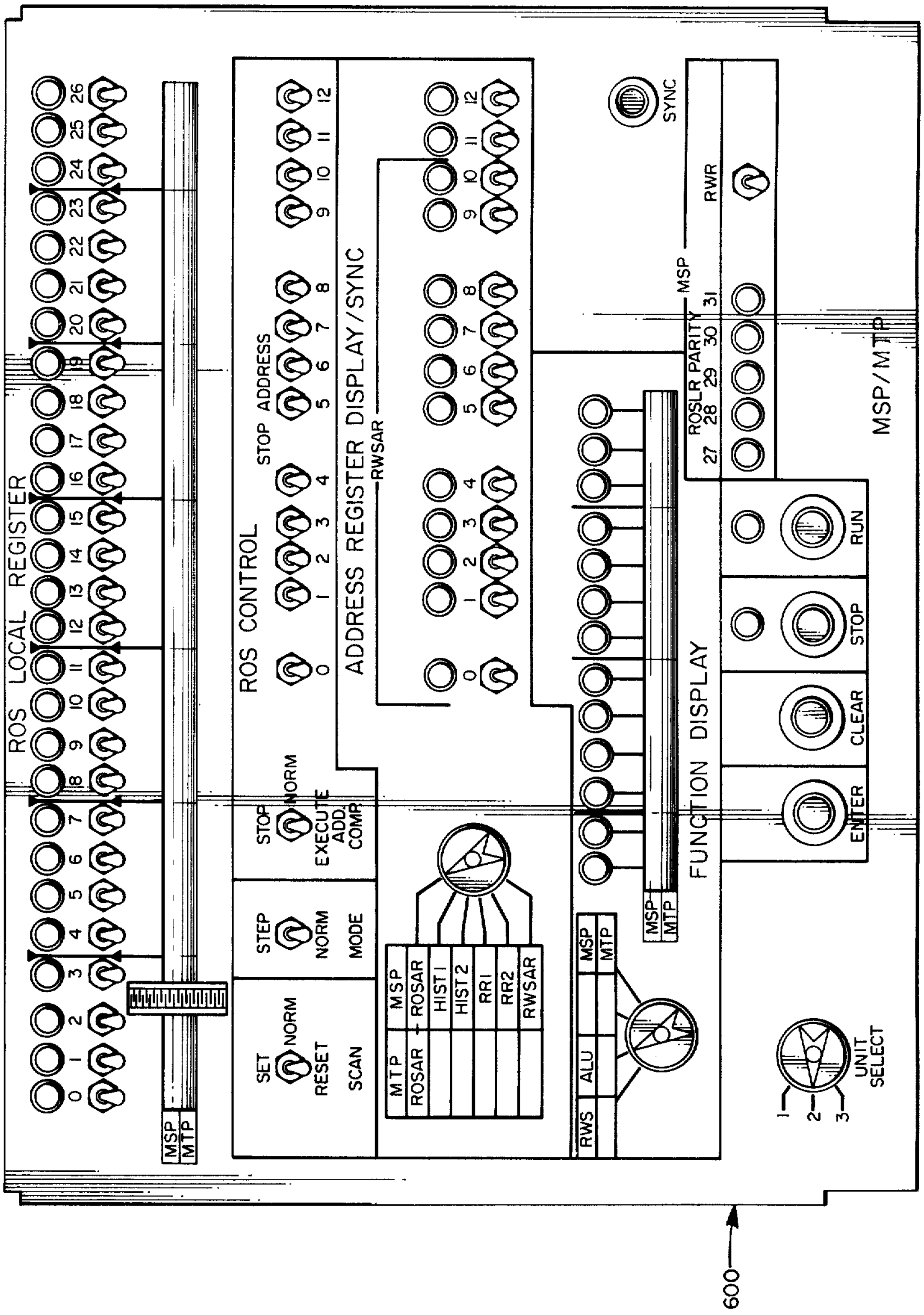
FIG. 1*a* illustrates in greater detail the maintenance panel of FIG. 1.

FIG. 1*a* shows some of the switches and indicators which comprise the maintenance panel 600. The panel includes facilities for testing a plurality of units, two of which are designated as MSP and MTP. The desired unit is selected by an UNIT SELECT switch located at the lower left hand corner of panel 600. Since the operations can be considered the same for both units, only one unit (e.g. the MSP) is discussed herein. As seen from the Figure, the panel is divided into four main areas having the designations: ROS local register; Ros control; Address Register Display/Sync; and Function Display. Starting at the top of the panel, it is seen that the read only store (ROS) local register area includes a plurality of indicator lamps (i.e. 27) and a corresponding number of toggle switches. Below the switches is a roll chart which gives the field bit patterns for each type microinstruction. This facilitates the interpretation of the display indicator lamps and the entering of microinstruction bit patterns. The indicator lamps continuously display the current contents of the ROS local register of a desired controller when the panel is connected to the controller which provides power to the panel. The toggle switches are used to enter bit patterns of microinstructions to be executed by the selected controller. As explained herein, the microinstructions set up by the switches are loaded into the ROS local register upon depression of an ENTER pushbutton located at the bottom center of the panel.

The ROS control area includes switches which control the operation of the read only store. The first switch is a SCAN switch which enables a field personnel to increment through the read only store and verify the contents of each location. Since this operation is not pertinent to the present invention, it will not be discussed further herein.

The next switch is a MODE switch which is used to control the mode of operation of the system clock within the MSP. When the switch is placed in the "NORM" position, the MSP system clock when started runs until stopped by the occurrence of a special condition (e.g. STOP pushbutton depressed, STOP ADDRESS compare indication, error condition, etc.). When the MODE switch is placed in the "STEP" position, the system clock operates for an interval corresponding to the duration of the clock pulse each time the RUN or ENTER pushbutton is depressed.

The ADD. COMP. switch on the panel is most pertinent to the present invention. The switch is a three position switch which is provided to select a cycling mode of operation for the read only store. When the switch is placed in the "NORM" position, the read only store cycles normally and the settings of a plurality of STOP ADDRESS switches are ignored by the apparatus of the present invention as described herein. When the switch is placed in the "STOP" position, the system clock stops when the address designated by the settings of the STOP ADDRESS switches compares to the address stored in the address register of the read only store. When the switch is set to the "EXECUTE ADD. COMP.", the instruction bit pattern set up by the ROS local register switches is entered into the ROS local register when the address designated by the settings of the STOP address switches compares with the address stored in the read only store address register. Further microinstructions are read out from the read only store as during normal operations as described herein.

As seen from FIG. 1*a*, the ADDRESS REGISTER DISPLAY/SYNC area includes a six position rotary switch for selecting the contents of any one of six registers for display and/or comparison for sync pulse generation. The selected register contents are continuously displayed on the lamps to the right of the rotary switch. The diagnostic and maintenance logic circuits generate a sync pulse at a SYNC jack below and to the right of this area, each time the selected register contents compare identically to the patterns set up on the toggle switches located below the Address Register Display/Sync indicator lamps.

The FUNCTION DISPLAY area includes a plurality of indicator lamps, roll charts and a four position rotary switch. The rotary switch selects the contents of the desired register for display. The switch is linked mechanically to the roll chart so that the visible portion of the chart corresponds to the selected register.

At the lower part of the panel is the three position UNIT SELECT switch and several control switches, some of which were discussed previously. As mentioned, the ENTER pushbutton switch causes a microinstruction established by the ROS local register toggle switches to be loaded into the ROS local register. A CLEAR switch, when depressed, causes the generation of a reset signal which resets the various indicating functions and control storage functions within the MSP. The STOP pushbutton when depressed is operative to stop the system clock as well as panel operation in addition to switching on an indicator lamp above the STOP pushbutton switch. The RUN pushbutton switch when depressed is operative to start the system clock if it had been stopped. The switch operates similar to the ENTER switch except that it causes the first microinstruction loaded into the ROS local register to be taken from the read only store and not from the panel ROS local register switches.

To the right of the run pushbutton switch are five indicator lamps used to display the parity bit contents of the ROS local register. These bit positions correspond to the portion of the ROS local register not displayed by the indicator lamps at the top of the panel. When a microinstruction is established by the ROS local register switches, the parity bits are automatically computed by circuits included therein and hence no switches are needed for this purpose. A last toggle switch is the RWR switch which in accordance with the present invention is used in conjunction with the ROS cycling mode switch. When this switch is set to the "EXECUTE ADD. COMP." position, the RWR switch when set to the ON position causes a reset signal to be generated and applied to the MSP when the ROS address register stores an address equal to the address set up by the STOP ADDRESS switches.

MAINTENANCE PANEL SYSTEM

Figure 1B:
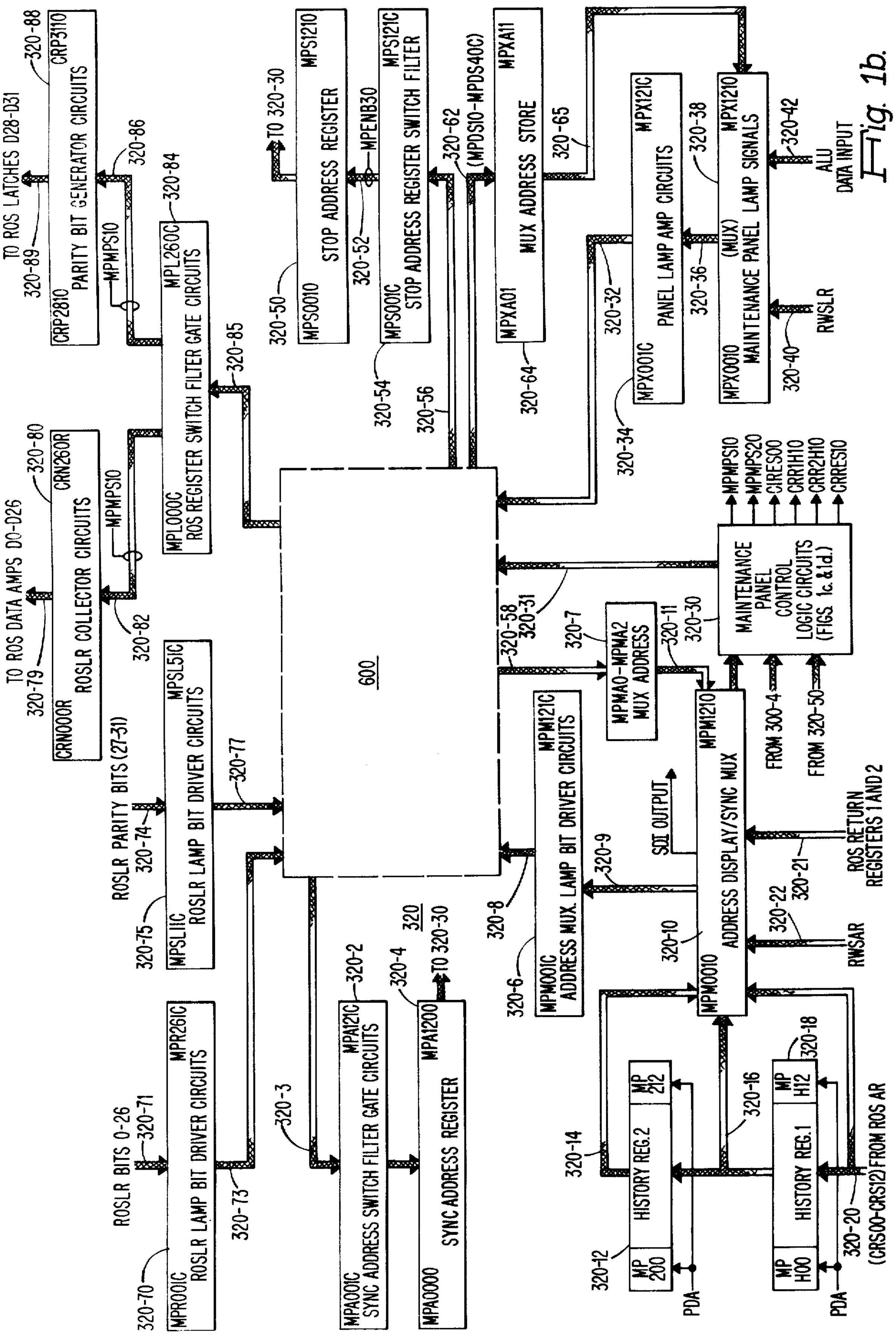
FIG. 1*b* illustrates in block diagram form the maintenance logic circuits of FIG. 1.

FIG. 1*b* shows in block diagram form, the various registers and logic circuits which comprise the maintenance panel system. As seen from FIG. 1*b*, the panel 600 receives a plurality of input signals from various sources within the MSP which are applied to a corresponding number of lamp driver circuits, conventional in design. Specifically, the signals from the ROS local register of the section 304 are applied to the circuits of blocks 320-70 and 320-75 and then to panel indicator lamps via buses 320-73 and 320-77. Also, signals from the RWS local register and ALU applied via buses 320-40 and 320-42 respectively are applied to the panel indicators via multiplexer and amplifier circuits of blocks 320-34 and 320-38 as shown. The appropriate source is selected by the setting of multiposition SELECT switch of the FUNCTION display area of the panel 600 which generate the appropriate signals for conditioning flip-flops of block 320-64.

In a similar fashion, the contents of the RWS address register, ROS return registers 1 and 2, history registers 1 and 2, and ROS address register are displayed via circuits 320-6 and 320-10 in response to setting of the multiposition switch of the ADDRESS REGISTER DISPLAY/SYNC area of panel 600. The contents of these registers are applied via buses 320-20, 320-14, 320-16, 320-22 and 320-21 as shown. Again, the panel selection switch generates signals such as those applied to bus 320-58 which in turn are applied to three flip-flops included in a MUX address storage block 320-7. The output signals from block 320-7 are applied to the circuits of block 320-10 to select the appropriate source (i.e. one of the eight states of the three of flip-flops select an appropriate one of eight inputs, only six of which are shown). In a similar fashion, the contents of MUX address store 320-64 are operative to select any one of four inputs applied to the multiplexer circuits of block 320-64. It will be appreciated that in the case where the panel 600 services more than one unit, selection is determined by the positioning of the UNIT SELECT switch as well as the register SELECT switch.

Signals generated by various panel switches are applied to filter gate circuits conventional in design, which operate to eliminate the effects of any switching transients. These circuits in turn apply their output signals to a corresponding number of flip-flops, the outputs of which are in turn applied to circuits included within block 320-30. Specifically, signals generated from the STOP ADDRESS switches and SYNC ADDRESS switches feed the registers 320-50 and 320-4 respectively. The ROS local register switch signals similarly are applied to switch filter gate circuits 320-84 and then to read only store section 304 via driver circuits 320-80 and to the parity bit generator circuits of block 320-88. The circuits 320-88 generate the appropriate parity bit signals which are then forwarded to section 304. The various control signals required for displaying and generating signals are generated by the control logic circuits of block 320-30 as explained herein. The various PDA clocking signals are generated by the system clock of FIG. 1.

Figure 1C:
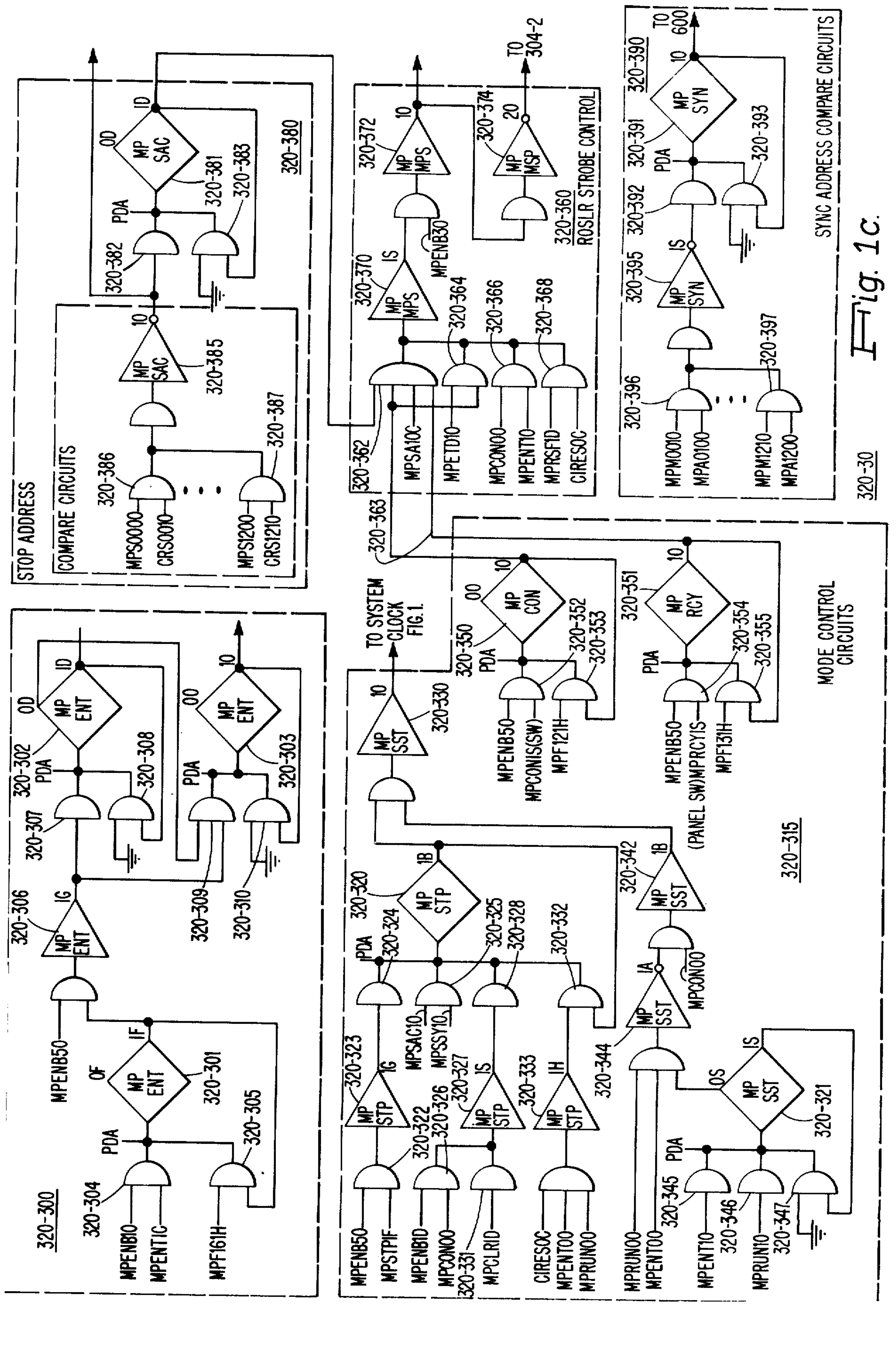
FIGS. 1*c* and 1*d* illustrate in greater detail the various blocks of FIG. 1*b*.
Figure 1D:
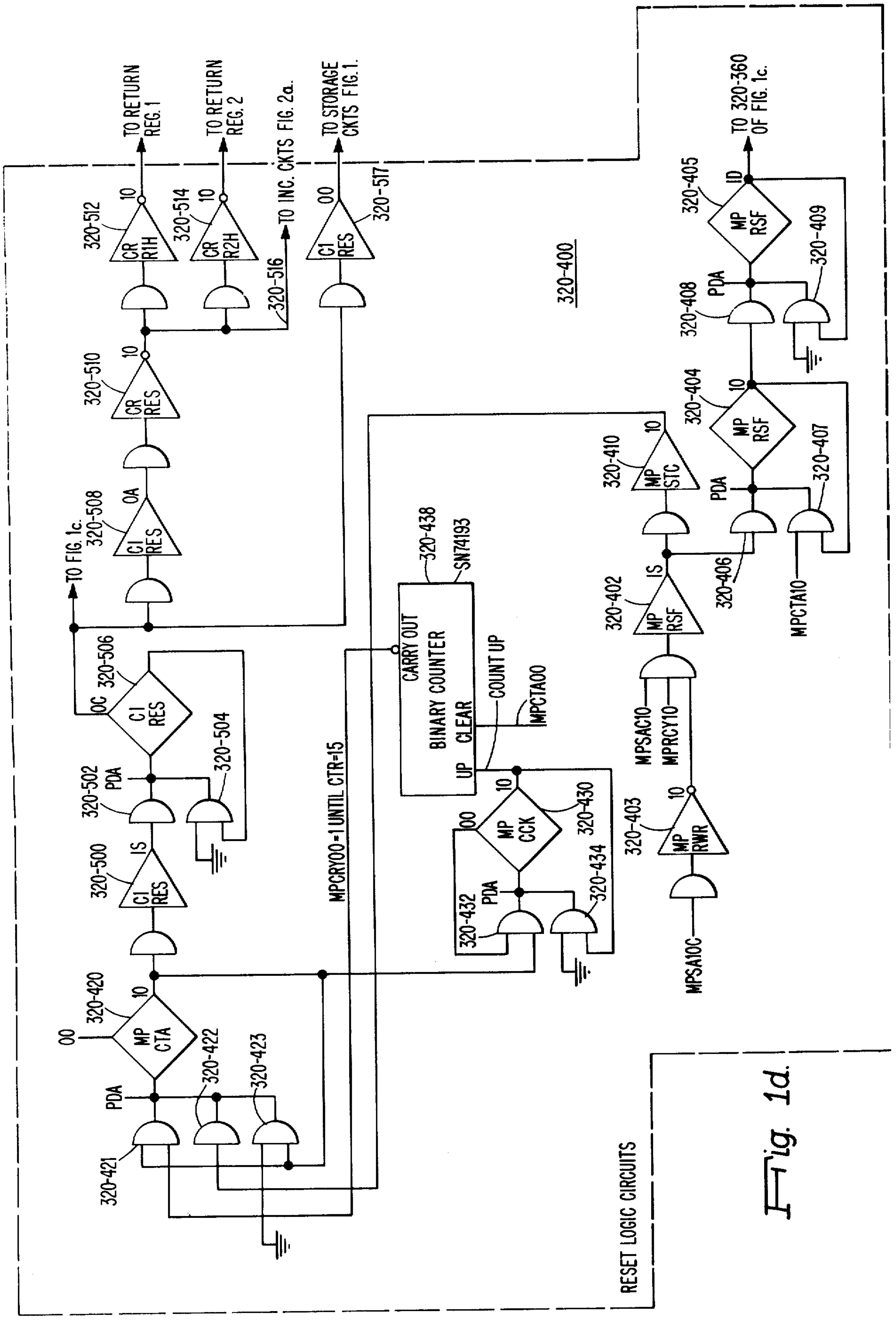

MAINTENANCE PANEL CONTROL LOGIC CIRCUITS — FIGS. 1*c* and 1*d*

The circuits included within block 320-30 of FIG. 1*b* will be discussed with reference to FIGS. 1*c* and 1*d*. Referring first to FIG. 1*c*, it is seen that a first block 320-300 includes three clocked or synchronous flip-flops 320-301 through 320-303 interconnected as shown and includes circuits 320-304 through 320-310. These circuits are arranged to be responsive to the ENTER pushbutton switch. When the ENTER pushbutton is depressed on panel 600, this forces signal MPENT1C to a binary ONE which switches the first flip-flop 320-301 to its ONE state. Normally, signal MPENB10 and signal MPENB50 are binary ONES when power is applied to panel 600. The binary ONE output of flip-flop 320-301 in turn switches flip-flops 300-302 and 300-303 in sequence upon the occurrence of subsequent PDA clocking pulses. This arrangement of flip-flops provides a bounce free output pulse at MPENT10 in response to each depression of the ENTER pushbutton switch.

A second block 320-315 includes a plurality of clocked flip-flops which establish certain modes of operation for the system clock and read only store of section 304 in accordance with the present invention. The flip-flops 320-320 and 320-321 form part of the circuits for enabling the system clock and ROS to be cycled at a single step at a time. The flip-flop 320-320 switches to a binary ONE via gating circuits 320-322 through 320-324 when the STOP pushbutton switch on the panel is depressed (i.e. signal MPSTP1F is forced to a binary ONE). Also, flip-flop 320-320 switches to a binary ONE via an AND gate 320-25 when the cycle mode switch is placed to the "STOP" position (i.e. signal MPSSY10 equals binary ONE) and there is a STOP ADDRESS comparison (i.e. signal MPSAC10 equals binary ONE).

An AND gate 320-328 also switches flip-flop 320-320 to a binary ONE via amplifier circuit 320-327 and gate 320-326 when the panel is enabled (i.e. signal MPENB1D is a binary ONE) and the MODE switch is set to the NORM position (i.e. signal MPCON00 is a binary ONE). The gate 320-331 is operative to switch the flip-flop to its binary ONE state when the CLEAR pushbutton switch is depressed (i.e. signal MPCLR1D is a binary ONE). This maintains the MSP in a stopped condition. The flip-flop 320-320 is held in a binary ONE state by a hold signal MPSTP1H applied to an AND gate 320-332. This gate remains on as long as the system is not reset by other than the CLEAR pushbutton switch (i.e. signal C1RESOC is a binary ONE), the ENTER pushbutton switch has not been depressed (i.e. signal MPENT00 is a binary ONE) and the RUN pushbutton switch has not been depressed (i.e. signal MPRUN00 is a binary ONE).

The binary ONE output of flip-flop 320-320 is applied to an AND gate and amplifier circuit 320-330 which also receives an output signal from the binary ZERO side of single step flip-flop 320-321 via circuits 320-342 and 320-344. The single step flip-flop 320-321 switches to a binary ONE when either the ENTER pushbutton switch is depressed (i.e. signal MPENT10 is a binary ONE) or the RUN pushbutton is depressed (i.e. signal MPRUN10 is a binary ONE). The switching takes place in response to the signals applied via gates 320-345 and 320-346 upon the occurrence of a PDA clock pulse. The flip-flop 320-321 is reset to a ZERO a clock pulse later via AND gate 320-347.

When any one of the signals MPRUN00, MPENT00 or MPSSTOS are binary ZEROS, an AND gate and inverter circuit 320-344 causes an AND gate and amplifier circuit 320-342 to switch signal MPSST1B to a binary ONE when the MODE switch is in the step position (i.e. signal MPCON00 is a binary ONE). This in turn causes the gate and amplifier circuit 320-330 to produce an output pulse signal MPSST10 when flip-flop 320-320 is in its binary ONE state. This pulse is applied to the system clock of FIG. 1 allowing it to be enabled for operation during an interval corresponding to one clock pulse.

A pair of clocked flip-flops 320-350 and 320-351 establish the cycling mode of operation for the read only store. More specifically, flip-flop 320-350 switches to its binary ONE state via AND gate 320-352 when the cycle switch is placed to the "NORM" position (i.e. signal MPCON1S is a binary ONE). The flip-flop 320-351 switches to a binary ONE via an AND gate 320-354 when the cycle switch is set to the EXECUTE ADD. COMP. position (i.e. signal MPRCY1S is a binary ONE). An AND gate 320-353 and AND gate 320-355 respectively reset flip-flops 320-350 and 320-351 to binary ZEROS when signal MPF121H and signal MPF131H are forced to binary ZEROS. These signals are generated by other circuits not shown which are not pertinent to the present invention.

The binary ONE outputs of the flip-flops 320-350 and 320-351 are applied to an AND gate 320-362 of a ROS local register strobe control block 320-360. The gate 320-362 additionally receives an output signal from the comparison circuits of block 320-380. Also, the AND gate 320-362 receives a signal MPSA1OC from the reset (RWR) switch. This signal is a binary ONE when RWR switch is in the "OFF" position. An AND gate 320-364 causes a strobe signal to be generated when the MODE switch is in the "NORM" position (i.e. signal MPCON10 is a binary ONE) when signal MPETD10 is a binary ONE (i.e. the ENTER pushbutton switch has been depressed). This signal is derived from the binary ONE output of ENTER flip-flop 320-301 and occurs one clock pulse later. Also, an AND gate 320-366 causes the generation strobe signal in response to each depression of the ENTER switch (i.e. signal MPENT10 is a binary ONE) when the MODE switch is in the "STEP" position (i.e. signal MPCON00 is a binary ONE). A further AND gate 320-368 causes the generation of a strobe signal when the reset logic circuits of FIG. 1*d* force signal MPRSF1D and signal C1RESOC to binary ONES as explained herein.

An AND gate and amplifier circuit 320-372 applies the strobe signal MPMPS1S from the inverter circuit 320-370 to the gate circuits of FIG. 1*b* to sample the state of the ROS local register panel switches. The gate and inverter circuit 320-374 inverts the strobe signal MPMPS1O and uses it to gate signals read out from the read only store 304-2 of FIG. 2. The blocks 320-380 and 320-390 each include comparison gate circuits and a flip-flop for storing the results of address comparisons. The AND circuits 320-386 through 320-387 compare the contents of the STOP ADDRESS switches and the contents of the ROS address register and when there is a true comparison they cause an inverter circuit 320-385 to force signal MPSAC10 to a binary ONE. This in turn sets flip-flop 320-381 to a binary ONE via a gate 320-382. An AND gate 320-383 resets the flip-flop to a binary ZERO one PDA clock pulse later when there is no address compare. Similarly, the AND gates 320-396 through 320-397 compare the address signals from the SYNC ADDRESS switches with the address contents of any one of the selected register sources and cause a gate and inverter circuit 320-395 to force signal MPSYN1S to a binary ONE which in turn switches flip-flop 320-391 to a binary ONE state via a gate 320-392. One clock pulse later, an AND gate 320-393 switches the flip-flop to a binary ZERO. The output pulse at the binary ONE side of flip-flop 320-391 is applied to the SYNC jack of panel 600.

FIG. 1*d* shows the reset logic circuits of block 320-400 which operate to generate reset signals in accordance with the present invention. It will be noted that the signals MPSAC10, MPRCY10 and MPRWR10 are applied to a further AND gate 320-402. The signal MPRWR10 applied via a gate and inverter circuit 320-403 is a binary ONE when reset (RWR) switch is in the ON position. The AND gate and amplifier circuit 320-402 by forcing signal MPRSF1S causes a gate and amplifier circuit 320-410 to switch signal MPSTC10 to a binary ONE. This causes a gate 320-422 to switch a flip-flop 320-420 to a binary ONE which forces signal MPCTA10 to a binary ONE. This in turn enables a flip-flop 320-430 via an AND gate 320-432 for operation. This flip-flop is connected to complement upon each PDA clock pulse in turn producing a train of clock pulses which are applied to a "count up" input terminal of a four stage binary counter 320-438. Previously, when flip-flop 320-420 was in a binary ZERO state, signal MPCTA00 held the counter 320-438 in a CLEARED state. When flip-flop 320-420 switched to a binary ONE, clock pulses generated by flip-flop 320-430 began incrementing the counter through successive counts. When the binary counter 320-438 advances to a count of 15, it causes signal MPCRY00 at its carry out terminal to switch from a binary ONE to a binary ZERO state. This renders an input AND gate 320-421 inactive thereby allowing flip-flop 320-420 to be switched to its binary ZERO state by a recirculation AND gate 320-423 in response to a PDA clock pulse signal. At this time, signal MPSAC10 is assumed to be a binary ZERO. The binary counter arrangement conditions flip-flop 320-420 to be held in its binary ONE state for a predetermined period of time in order to establish a minimum pulse width for the reset signals used to set the various storage devices within the system of FIG. 1. That is, it is seen that the binary ONE output side of flip-flop 320-420 is applied to a gate and amplifier circuit 320-500 whose output is applied to an input gate 320-502 of a reset flip-flop 320-506. A gate and amplifier circuit 320-500 conditions an input gate 320-502 to switch the flip-flop 320-506 to its binary ONE state. The flip-flop remains in this state until flip-flop 320-420 switches to a binary ZERO. The time that flip-flop 320-420 remains in its binary ONE state determines the duration that reset flip-flop 320-506 remains in its binary ONE state. When flip-flop 320-420 switches to a binary ZERO, this enables AND gate 320-502 to again switch the reset flip-flop to its binary ZERO state. The binary ZERO output signal C1RESOC is applied to circuits of FIG. 1*c*. The signal allows the flip-flop 320-320 to be reset to a binary ZERO state and inhibits operation of AND gate 320-368 of the strobe control block 320-360 during the reset interval.

Reset flip-flop 320-506 when set to a binary ZERO conditions the gate circuit 320-508 to cause gate and inverter circuit 320-510 to force reset signal CRRES10 to a binary ONE. This signal when a binary ONE causes both gate and inverter circuits 320-512 and 320-514 to force corresponding hold signals CRR1H10 and CRR2H10 to binary ZEROS resetting return registers 1 and return registers 2 of section 304 to their ZERO states. The reset signal CRRES10 is applied via line 320-516 to the increment logic circuits 304-8 of FIG. 2*a*. Signal CRRES10 conditions a gate 304-84 to force increment signal CRINC10 to a binary ZERO inhibiting incrementing of the address contents of the read only store address register 304-4. It will also be noted that the binary ZERO output of reset flip-flop 320-506 supplied to a gate and amplifier circuit 320-517 which is in turn forwarded to the storage circuits of FIG. 1. These storage circuits include the flip-flops which comprise the cycle control storage of block 308-10 and the strobe circuits of the branch test block 304-34 of FIG. 2*a*.

During the interval that signal MPCTA10 is a binary ONE, a pair of series connected flip-flops 320-404 and 320-405 are both binary ONES. The flip-flop 320-404 switches to a binary ONE when signal MPRSF1S is forced to a binary ONE and is held in this state by signal MPCTA10 which is applied to hold AND gate 320-407. The flip-flop 320-405 switches to a binary ONE one clock pulse later in response to signal MPRSF10 applied via a gate 320-408. The flip-flop remains in its ONE state as long as signal MPRSF10 is a binary ONE. When signal MPRSF10 is forced to a binary ZERO, a recircuitation AND gate 320-409 switches flip-flop 320-405 to a binary ZERO upon the occurrence of a PDA clock pulse. It will be noted that the binary ONE output of flip-flop 320-405 is also applied to the AND gate 320-368 of FIG. 1*c*. Therefore, at the termination of the reset interval, signal MPCTA10 upon being forced to a binary ZERO causes signal C1RESOC to be forced to a binary ONE. Since signal MPRSF1D is forced to a binary ZERO a clock pulse later, AND gate 320-368 is operative to generate a strobe pulse after the reset interval. The strobe pulse forces signal MPMPS10 to a binary ONE allowing the pattern established by the switches to be applied to the ROS sense amplifier latches.

The different types of circuits such as counters, drivers and logic gating circuits shown are conventional in design and may for example take the form of circuits disclosed in the aforementioned text published by Texas Instruments Inc.

DESCRIPTION OF OPERATION

With reference to FIGS. 1, 1*a* through 1*d*, 2, 2*a*, and FIGS. 3*a* through 3*h*, the operation of the diagnostic apparatus of the present invention will be described with reference to the timing diagram of FIG. 4 and the flow chart of FIG. 5. In accordance with the diagnostic apparatus of the present invention, a service engineer is able to operate the system of FIG. 1 in a variety of modes for determining the cause of fault conditions. First, a service engineer is able to substitute any type microinstruction normally contained within the read only store 304-2 of FIG. 2 into the ROS local register 304-32 and have it executed in a normal manner. As seen from the flow chart of FIG. 5, this is done by setting up the ROS local register switches on panel 600 to the bit pattern of the type of microinstruction to be substituted and followed by depressing the ENTER pushbutton switch. As seen from FIG. 1*c*, either AND gate 320-364 or 320-366 causes the generation of strobe signals MPMPS10 and MPMPS20 which allows the microinstruction from the switches to be loaded into the ROS local register in place of the microinstruction from the read only store 304-2. When the MODE switch is in the "NORM" position, AND gate 320-364 generates a strobe signal following the depression of the ENTER pushbutton switch. The substituted microinstruction is executed followed by the execution of microinstructions from the read only store 304-2 in a normal manner. However, when the MODE switch is in the "STEP" position, AND gate 320-364 produces the strobe signals following the depression of the ENTER pushbutton switch, only the substituted microinstruction is executed after which time the system clock is stopped as illustrated by the flow chart of FIG. 5. Of course, if the microinstruction being substituted is a normal conditional branch microinstruction execution will not take place until another clock pulse is generated (i.e. requires two clock pulses; one for loading the microinstruction into the ROS local register and another for effecting the branch). By setting up a no op type microinstruction using the ROS local register switches, it is possible to skip over or bypass any microinstruction stored in read only store 304-2.

Figure 4:
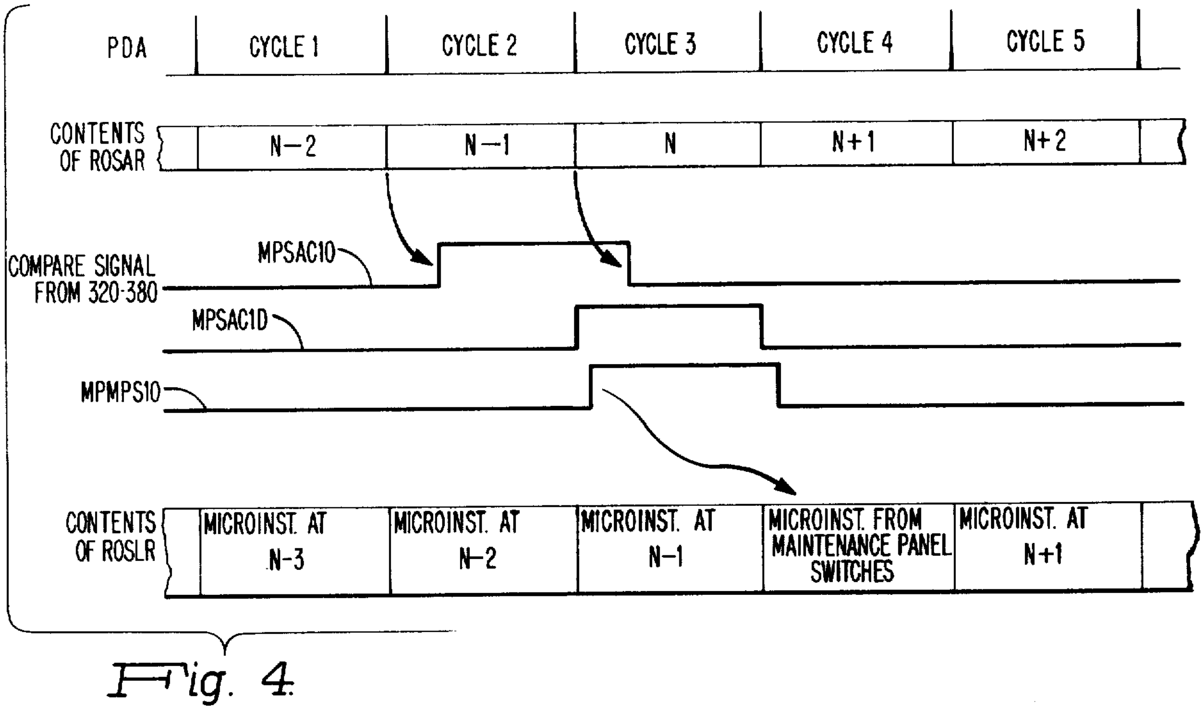
FIG. 4 is a timing diagram illustrating one of the modes of operation of the diagnostic apparatus of the present invention.

FIG. 4 is a timing chart illustrating the timing sequence of microinstructions executed by the read only storage controls 304 during a substitute operation when it desired to recycle through a loop of instructions in a conventional manner. To perform this operation, the ROS local register switches on panel 600 are again set to the bit pattern of the type of microinstruction to be substituted. The cycle switch is set to the EXECUTE ADD. COMP. position and the MODE switch is set to "NORM" position. The reset (RWR) switch remains in the "OFF" position. The STOP ADDRESS switches of the panel 600 are set to the appropriate address as explained herein and the RUN pushbutton switch is depressed.

As indicated by FIG. 4, the STOP ADDRESS switches are set to an address which is one less than the address of the location which stores the microinstruction being replaced. The reason is that the address loaded into the ROS address register of the read only store 304-2 normally occurs one PDA clock pulse before the execution of the microinstruction because the microinstruction is decoded only when it has been loaded into the ROS local register. Therefore, during a cycle prior to the addressing of the microinstruction to be substituted, the compare circuits of block 320-380 of FIG. 1*c* are operative to switch compare flip-flop 320-381 to a binary ONE. Upon the occurrence of the next PDA clock pulse, AND gate 320-362 of the strobe control block 320-360 forces strobe signals MPMPS10 and MPMPS20 to a binary ONE and binary ZERO respectively.

As described previously, the strobe signal MPMPS20 when forced to a binary ONE state renders the read only store 304-2 inactive so as to prevent the reading out of signals from the store circuits into the sense amplifier latches 304-25. The signals sampled from the ROS local register switches are applied to the latches 304-25. During the next PDA clock pulse, the same signals are loaded into the ROS local register 304-32 and the microinstruction is executed.

Figure 5:
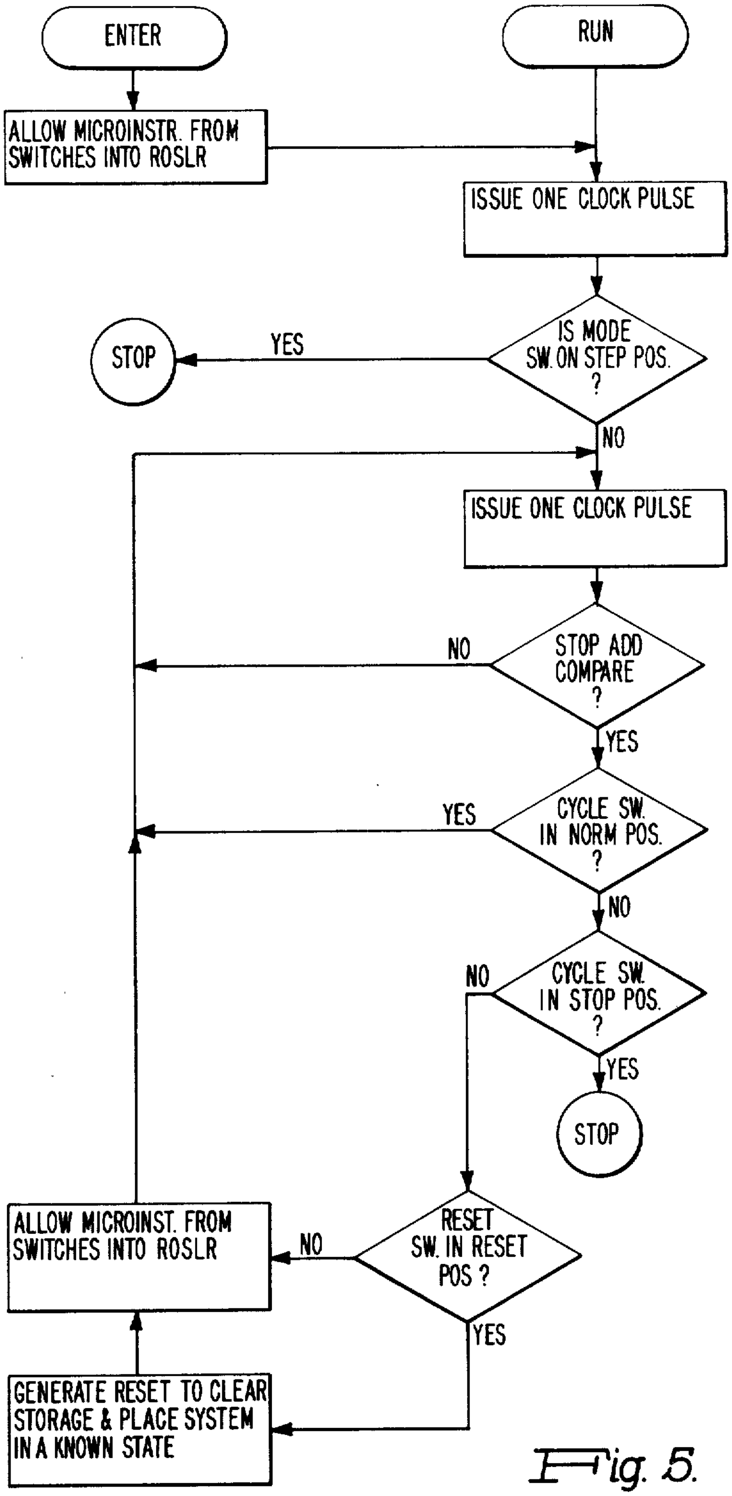
FIG. 5 is a flow chart used to explain the operation of the diagnostic apparatus of the present invention.

As seen from FIG. 5, when the MODE switch is set to the "NORM" position, and the cycle switch is set in the STOP position, the system clock stops (i.e. flip-flop 320-320 is set to a binary ONE via AND gate 320-325) when the comparison circuits signal a comparison between the STOP ADDRESS switches and the contents of the ROS address register. At that time, the address corresponding to that set up by the STOP ADDRESS switches resides in the ROS history address register 1. History address register 2 contains the address of the microinstruction executed prior to reaching the stop address. This occurs because the history registers 1 and 2 store in sequence the addresses received from the ROS address register in response to successive PDA clocking signals. When the microinstruction located at the stop address is an unconditional branch or fast conditional branch, the microinstruction will have been executed when the system clock stops (i.e. the microinstruction of ROS local register will be the result of the branch operation). This occurs because the FCB and UCB microinstructions are decoded by the branch circuits upon being loaded into the data latches 304-25. From this, it can be seen that when the MODE switch in the "NORM" position and an unconditional or fast conditional branch microinstruction has been set up on the ROS local register switches, the read only store 304-2 will be made to cycle continually between the branch address specified by the microinstruction and the stop address. Thus, the system can be cycled or recycled continuously between two address positions when the cycle switch is in the EXECUTE ADD. COMP. position as mentioned.

In addition to the above-mentioned modes of operation, it is possible through the use of the diagnostic apparatus of the present invention to set up a loop of microinstructions for viewing the time occurrence of an error condition on display equipment such as a test oscilloscope. This mode of operation involves positioning the cycle switch to the EXECUTE ADD. COMP. position and placing the reset (RWR) switch to the "ON" position. This renders AND gate 320-362 inactive (i.e. signal MPSA10C is a binary ZERO) and causes the generation of a reset signal followed by the generation of the strobe signals. That is, upon the generation of a comparison signal MPSAC10, gate 320-410 of FIG. 1*d* forces signal MPSTC10 to a binary ONE which sets flip-flop 320-420 to a binary ONE. This causes generation of reset signals which causes signals CRR1H10 and CRR2H10 to be forced to binary ZEROS resetting return registers 1 and 2 of FIG. 2*a* to binary ZEROS. At the same time, signal CRRES10 inhibits the incrementing of the contents of the address register while signal C1RES00 is forwarded to the various storage circuits within the blocks of FIG. 1 and causes the resetting of those circuits to an initial state. The signal C1RES00 also forces strobe signal CRSTR10 to a binary ZERO which inhibits the transfer of signals from the data latches 304-25 during the reset interval when the ROS address register 304-4 is forced to an all zero address location placing the read only store 304-2 to a known state. At the end of the reset interval, AND gate 320-368 causes the generation of the strobe signals MPMPS10 and MPMPS20. The microinstruction bit pattern established by the ROS local register switches is loaded into the ROS local register 304-32. Operation then continues normally. This is illustrated by FIG. 5.

By setting up the STOP ADDRESS switches to correspond to a point in a routine following the occurrence of an error condition and to set up an unconditional branch microinstruction bit pattern using the ROS local register switches forces the store to a location referenced before the occurrence of the error condition, the diagnostic apparatus is able to generate repeatedly the same related signals in the loop for observance by the test equipment. Because the read only store 304-2 is always forced to a known state before beginning execution of the loop of instructions, the diagnostic apparatus eliminates the possibility of having the loop of microinstructions executed in a different manner.

In addition to the above modes of operation, the diagnostic apparatus of the invention includes circuits for generating a SYNC pulse when address signals from a selected one of a number of sources of FIG. 1b compares identically to the address signals established by the SYNC ADDRESS switches of panel 600. Referring to FIG. 1b, it is seen that the address display/sync mux 320-10 is conditioned by signals from the register SELECT switch to select contents of one of the registers shown for comparison with the address established by the SYNC switches. The circuits 320-390 of FIG. 1c perform the comparison and are operative to set flip-flop 320-391 when the true comparison is signaled. This causes the output of the one side of flip-flop 320-391 to be applied to the SYNC pulse jack of FIG. 1a. The particular arrangement enables the synchronizing of test equipment such as in a oscilloscope with address signals from any one of a number of different sources independently of the setting of the STOP ADDRESS switches. This of course facilitates diagnosis of faults within the system of FIG. 1.

From the above, it is seen that the diagnostic apparatus of the present invention facilitates the diagnosing of faults within a microprogrammed system. By being able to operate the read only store of the system in a number of modes, it is possible to vary the manner of sequencing through microinstructions contained within the store. More specifically, the invention enables the substitution of any type of microinstruction in place of existing microinstructions thereby enabling diagnosis to continue when certain test conditions normally required to be present for the testing are not present. Also, diagnostic apparatus of the present invention facilitates the establishing of a loop whereby service personnel can repeat execution of the sequence of microinstructions in the same manner as they were executed initially. This is accomplished by having the system forced to a known state and then forcing the store to the starting address of a routine to be tested.

It will be obvious to those skilled in the art that many modifications may be made to the arrangement of the present invention.

While in accordance with the provisions and statutes, there has been illustrated and described the best form of the invention known, certain changes may be made to the apparatus of the invention without departing from the spirit and scope of the invention as set forth in the appended claims and that in some cases, certain features of the invention may be used to advantage without corresponding use of other features.

What is claimed is:

1. A diagnostic system for a microprogrammed processing unit including an unalterable addressable control store having a plurality of storage locations for storing microinstruction words, an address register means coupled to said control store for referencing said storage locations, output register means coupled to said control store for storing temporarily microinstruction words read out from referenced locations during cycles of operation and decoder means coupled to said output register for decoding said microinstruction word contents to generate signals to control the operations of said processing unit, said diagnostic system comprising:

a first plurality of switching means for generating address signals designating a storage location of said control store whose contents are to be substituted;

comparator means coupled to receive said address signals from said first plurality of switches and being coupled to receive signals from said address register means, said comparator means being operative upon detecting a true comparison between said address signals to generate an output signal;

a second plurality of switching means for generating a substitute microinstruction bit pattern, said second plurality of switching means being coupled to said output register means; and, control means coupled to said comparator means and to said control store, said control means including logic means coupled to said output register and to said control store, said logic means being operative in response to said output signal to generate first and second signals respectively for loading signals representative of said substitute microinstruction bit pattern into said output register means and for inhibiting said control store from reading out the microinstruction word contents of the storage location addressed during that cycle of operation thereby enabling generation of said signals for said controlling of said processing unit in accordance with the coding of said substitute microinstruction bit pattern.

2. The system of claim 1 wherein said control means includes mode control means for establishing a plurality of modes for cycling said control store, said mode control means being coupled to said logic means and operative when in a first mode to condition said logic means for generating said first and second signals upon each occurrence of said output signal for enabling said controlling of said processing unit in accordance with the coding of said microinstruction bit pattern.

3. The system of claim 2 wherein said mode control means includes:

a plurality of bistable storage means, eacn individually coupled to said logic means, input switch selection means coupled individually to each of said bistable storage means, said input switch selection means being operative to switch a predetermined one of said bistable storage means from a first state to a second state in accordance with the positioning of said switch selection means for establishing said first mode of said plurality of modes.

4. The system of claim 2 wherein said first and second plurality of switching means each includes a plurality of manually controlled switch circuit means for generating binary coded signals corresponding to said address signals and said substitute microinstruction bit pattern.

5. The system of claim 1 wherein said second plurality of switching means are set to generate a predetermined microinstruction bit pattern defining a no operation type microinstruction for bypassing the microinstruction word stored at said storage location designated.

6. The system of claim 1 wherein said second plurality of switching means are conditioned to generate a predetermined type of microinstruction bit pattern for causing said store to return to a predetermined storage location within said store and wherein said control means includes;

mode control means coupled to said logic means;

reset switching means coupled to said logic means; and reset control means coupled to said reset switching means, said comparison means, said address register means and to storage devices within said processing unit, said mode control means and said reset switching means when set to a first mode conditioning said reset control means to generate in response to said output signal a reset control signal for clearing said address register means to a predetermined address and said storage devices to a known state and said reset control means being coupled to said logic means and operative at the termination of said reset control signal to condition said logic means for generating said first and second control signals for said enabling of said controlling of said processing unit in accordance with the coding of said substitute microinstruction bit pattern causing said processing unit to proceed through the execution of a given microinstruction sequence in the same manner independent of the results of executing said sequence previously.

7. The system of claim 6 wherein said reset switching means when set to a second mode inhibiting operation of said reset control means and said logic means being operative to cause said store to cycle between storage locations defined by said first plurality of switching means and said predetermined type of microinstruction bit pattern.

8. The system of claim 6 wherein said predetermined type of microinstruction bit pattern includes an op code field coded to specify an unconditional branch operation and a branch address field coded to designate said predetermined storage location defining a microinstruction loop including said sequence.

9. The system of claim 6 wherein said mode control means includes:

a plurality of bistable storage means, each individually coupled to said logic means, input switch selection means coupled individually to each of said bistable storage means, said input switch selection means being operative to switch a predetermined one of said bistable storage means from a first state to a second state in accordance with the positioning of said switch selection means for establishing said firse mode of said plurality of modes and wherein said reset switching means includes a manually controlled switch circuit means having first and second positions, said switch circuit operating in said first mode when placed in said first position.

10. The system of claim 6 wherein said reset control means including counter means operative to generate said reset control signal so as to have a predetermined time duration for enabling said clearing of all of said processing unit storage devices required to place said unit in said known state.

11. The system of claim 6 wherein said first plurality of switching means are set to designate a storage location having an address one less than the storage location storing the microinstruction being substituted.

12. The system of claim 8 wherein said diagnostic system further includes branch control means coupled to said address register means and to receive said microinstruction word contents, said branch control means being responsive to predetermined type microinstruction words to perform testing of signals representative of the occurrence of different external and internal events indicated by the states of said storage devices, said branch control means being conditioned upon said clearing of said address register means and said storage devices to sequence said control store through said loop each time in the same manner.

13. The system of claim 6 wherein said diagnostic system further includes:

a third plurality of switching means for generating address for designating a storage location used to synchronize the cycling of said control store to an auxiliary device;

comparator means coupled to said address register means and to said third plurality of switching means, said comparator means being operative to generate a control signal upon detecting a true comparison between said signals; and, output generating means coupled to said comparator means and operative to generate an output synchronizing pulse for said device in response to each occurrence of said control signal.

14. The system of claim 13 wherein said address register means includes:

an address register coupled to said store;

a plurality of return address registers individually coupled to said address register;

an increment register individually coupled to said plurality of said return registers and to said address register and said reset control means generating a plurality of signals for conditioning each of said registers to be cleared to said known state forcing said address register to said initial address.

15. The system of claim 14 wherein said initial address is coded as an all zero address code.

16. A diagnostic maintenance apparatus for controlling the operation of a microprogrammed processing unit including an unalterable addressable control store having a plurality of storage locations for storing sequences of microinstructions, address storage means coupled to said control store for referencing said storage locations, output register means coupled to said control store for storing temporarily the microinstruction contents read out from storage locations referenced during cycles of operation and decoder means coupled to said output register means for decoding said microinstruction contents for generating control signals therefrom, said diagnostic maintenance apparatus comprising:

a first plurality of switching means for generating a first set of coded signals designating a storage location within said control store whose contents are to be substituted with another microinstruction;

comparator means coupled to receive said first set of coded signals and coupled to receive signals from said address storage means, said comparator means being operative to generate an output signal signaling a true comparison between said signals;

a second plurality of switching means coupled to said output register means for generating a second set of coded signals corresponding to said another microinstruction; and, control means coupled to said comparator means and to said output register means, said control means including signal generating means operative in response to said output signal to generate signals for conditioning said control store and said output register means for enabling the substitution of said another microinstruction in place of the microinstruction contents of the microinstruction designated by said first set of coded signals for decoding by said decoder means.

17. The system of claim 16 wherein said control means includes mode control means for establishing a plurality of modes for cycling said control store, said mode control means being coupled to said signal generating means and operative when in a first mode to condition said generating means for generating said signals upon each occurrence of said output signal for enabling said controlling of said processing unit in accordance with the coding of said microinstruction.

18. The system of claim 17 wherein said mode control means includes:

a plurality of bistable storage means, each individually coupled to said generating means, input switch selection means coupled individually to each of said bistable storage means, said input switch selection means being operative to switch a predetermined one of said bistable storage means from a first state to a second state in accordance with the positioning of said switch selection means for establishing said first mode of said plurality of modes.

19. The system of claim 17 wherein said first and second plurality of switching means each includes a plurality of manually controlled switch circuit means for generating binary coded signals corresponding to said first and second sets of signals.

20. The system of claim 16 wherein said second plurality of switching means are set to generate a predetermined microinstruction defining a no operation type microinstruction for bypassing the microinstruction stored at said storage location designated.

21. The system of claim 16 wherein said second plurality of switching means are conditioned to generate a predetermined type of microinstruction for causing said store to return to a predetermined storage location within said store and wherein said control means includes;

mode control means coupled to said generating means;

reset switching means coupled to said generating means; and reset control means coupled to said reset switching means, said comparator means, said address storage means and to storage devices within said processing unit, said mode control means and said reset switching means when set to a first mode conditioning said reset control means to generate in response to said output signal a reset control signal for clearing said address storage means and said storage devices to a known state and said reset control means being coupled to said generating means and operative at the termination of said reset control signal to condition said generating means for generating said signals for said enabling of said controlling of said processing unit in accordance with the coding of said substitute microinstruction as to have said processing unit proceed through the execution of a given microinstruction sequence in the same manner independent of the results of executing said sequence previously.

22. The system of claim 21 wherein said reset switching means when set to a second mode inhibiting the operation of said reset control means and said generating means being operative to cause said store to cycle only return storage locations defined by said first plurality of switching means and said predetermined type of microinstruction.

23. The system of claim 21 wherein said predetermined type of microinstruction includes an op code field coded to specify an unconditional branch operation and a branch address field coded to designate the said predetermined storage location defining a microinstruction loop including said sequence.

24. The system of claim 21 wherein said mode control means includes:

a plurality of bistable storage means, each individually coupled to said generating means, input switch selection means coupled individually to each of said bistable storage means, said input switch selection means being operative to switch a predetermined one of said bistable storage means from a first state to a second state in accordance with the positioning of said switch selection means for establishing said first mode of said plurality of modes and wherein said reset switching means includes a manually controlled switch circuit means having first and second positions, said switch circuit operating in said first mode when placed in said first position.

25. The system of claim 21 wherein said reset control means including counter means operative to generate said reset control signal so as to have a predetermined time duration for enabling said clearing of all of said processing unit storage devices required to place said unit in said known state.

26. The system of claim 20 wherein said first plurality of switching means are set to designate a storage location having an address one less than the storage location storing the microinstruction being substituted.

27. The system of claim 23 wherein said diagnostic system further includes branch control means coupled to said address storage means and to receive said microinstruction word contents, said branch control means being responsive to predetermined type of microinstructions to perform testing of signals representative of the occurrence of different external and internal events indicated by the states of said storage devices, said branch control means being conditioned upon said clearing of said address storage means and said storage devices to sequence said control store through said loop each time in the same manner.

28. The system of claim 21 wherein said diagnostic system further includes:

a third plurality of switching means for generating address for designating a storage location used to synchronize the cycling of said control store to an auxiliary device;

comparator means coupled to said address register means and to said third plurality of switching means, said comparator means being operative to generate a control signal upon detecting a true comparison between said signals; and, output generating means coupled to said comparator means and operative to generate an output synchronizing pulse for said device in response to each occurrence of said control signal.

29. For a microprogrammed peripheral controller including processing means for processing commands involving data transfer operations, a plurality of storage registers for storing status and information required for said processing, a microprogrammed control unit including a read only store for storing a plurality of microinstructions, an address register for referencing said microinstructions, an output register coupled to said store for storing temporarily referenced microinstructions during the cycling of said store for decoding into signals to direct said processing of said commands and branch control means coupled to said store, said address register and to different points within said controller for sequencing said read only store in response to testing for the presence of certain conditions within said controller, maintenance control apparatus comprising:

a first plurality of switching means for generating a set of address signals designating a storage location of said read only store whose contents are to be substituted;

comparison means coupled to receive said address signals and being coupled to receive signals from said address register, said comparison means being operative upon detecting an identical comparison between said signals to generate an output signal;

a second plurality of switching means for generating coded microinstruction bit pattern signals, said second plurality of switching means being coupled to said output register; and, control means coupled to said comparison means, said control means including gating means coupled to said output register, said gating means being operative in response to said output signal to condition said output register for receiving in substitution for the microinstruction being read out of said designating storage location said coded microinstruction bit pattern signals for said decoding into signals.

30. The controller of claim 29 wherein said control means includes mode control means for establishing a plurality of modes for cycling said read only store, said mode control means being coupled to said gating means and operative when in a first mode to condition said gating means upon each occurrence of said output signal for enabling said output register for receiving said microinstruction bit pattern signals for decoding.

31. The controller of claim 29 wherein said second plurality of switching means are set to generate predetermined microinstruction bit pattern signals defining a no operation type microinstruction for bypassing the microinstruction word stored at said storage location designated.

32. The controller of claim 29 wherein said second plurality of switching means are conditioned to generate a predetermined type of microinstruction bit pattern for causing said store to return to a predetermined storage location within said store and wherein said control means includes;

mode control means coupled to said logic means;

reset switching means coupled to said logic means; and reset control means coupled to said reset switching means, said comparison means, said address register and to storage devices within said peripheral controller, said mode control means and said reset switching means when set in a first mode conditioning said reset control means to generate in response to said output signal a reset control signal for clearing said address register and said storage devices to an initial state and said reset control means being coupled to said gating means and operative at the termination of said reset control signal to condition said gating means for enabling of said controlling of said processing unit in accordance with the coding of said substitute microinstruction bit pattern as to have said controller proceed through the execution of a given microinstruction sequence in the same manner independent of the results of executing said sequence previously.

33. The controller of claim 32 wherein said reset switching means when set to a second mode inhibiting the operation of said reset control means and said gating means being operative to cause said store to cycle only between storage locations defined in accordance with said first plurality of switching means and said predetermined type of microinstruction bit pattern.

34. The system of claim 32 wherein said predetermined type of microinstruction bit pattern includes an op code field coded to specify an unconditional branch operation and a branch address field coded to designate the said predetermined storage location for defining a loop including said sequence.

35. The system of claim 32 wherein said controller further includes:

a third plurality of switching means for generating address for designating a storage location used to synchronize the cycling of said read only store to an auxiliary device;

comparator means coupled to said address register means and to said third plurality of switching means, said comparator means being operative to generate a control signal upon detecting a true comparison between said signals; and, output generating means coupled to said comparator means and operative to generate an output synchronizing pulse for said device in response to each occurrence of said control signal.

36. The system of claim 32 wherein said first plurality of switching means are set to designate a storage location having an address one less than the storage location storing the microinstruction being substituted.

37. The controller of claim 34 wherein said control unit further includes branch control means coupled to said address register and to receive said microinstruction word contents, said branch control means being responsive to predetermined type microinstruction words to perform testing of signals representative of the occurrence of different external and internal events indicated by the states of said storage devices, said branch control means being conditioned upon said clearing of said address register and said storage devices to sequence said control store through said loop each time in the same manner.

38. The controller of claim 37 wherein said control unit further includes:

a plurality of return address registers individually coupled to said address register;

an increment register individually coupled to said plurality of said return registers and to said address register and said reset control means generating a plurality of signals for conditioning each of said registers to be cleared to said initial state forcing said address register to a predetermined address.

39. The controller of claim 38 wherein said predetermined address is coded as an all zero address code.

* * * * *